US008212652B2

(12) United States Patent
Inoue et al.

(10) Patent No.: US 8,212,652 B2
(45) Date of Patent: Jul. 3, 2012

(54) BIOMETRIC AUTHENTICATION METHOD, BIOMETRIC AUTHENTICATION SYSTEM, IC CARD, AND TERMINAL

(75) Inventors: Takeshi Inoue, Kawasaki (JP); Shoko Hatanaka, Tokyo (JP); Makoto Aikawa, Sagamihara (JP); Hideyuki Takeda, Funabashi (JP)

(73) Assignee: Hitachi, Ltd., Tokyo (JP)

( * ) Notice: Subject to any disclaimer, the term of this patent is extended or adjusted under 35 U.S.C. 154(b) by 431 days.

(21) Appl. No.: 12/609,383

(22) Filed: Oct. 30, 2009

(65) Prior Publication Data
US 2010/0117791 A1 May 13, 2010

(30) Foreign Application Priority Data

Nov. 13, 2008 (JP) ................................. 2008-291287
Jul. 29, 2009 (JP) ................................. 2009-176469

(51) Int. Cl.
*H04Q 1/00* (2006.01)
*H04B 1/00* (2006.01)
*G05B 19/00* (2006.01)
*G06K 9/00* (2006.01)

(52) U.S. Cl. ...................... 340/5.82; 340/5.83; 340/5.52; 340/5.53; 340/5.85; 348/77; 382/124; 382/115

(58) Field of Classification Search .................. 340/5.82
See application file for complete search history.

(56) References Cited

U.S. PATENT DOCUMENTS

| 7,317,814 B2 * | 1/2008 | Kostrzewski et al. | ......... 382/115 |
| 7,610,492 B2 * | 10/2009 | Awatsu et al. | ................ 713/186 |
| 7,742,604 B2 * | 6/2010 | Yamagata et al. | ............ 380/270 |
| 7,787,662 B2 * | 8/2010 | Morita | .......................... 382/115 |
| 7,788,500 B2 * | 8/2010 | Okamura et al. | ............. 713/186 |

FOREIGN PATENT DOCUMENTS

| JP | 2005-038257 | | 2/2005 |
| JP | 2007-193476 | | 8/2007 |
| WO | WO98/13791 | A1 | 4/1998 |
| WO | WO02/095552 | A2 | 11/2002 |
| WO | WO02/095657 | A2 | 11/2002 |
| WO | WO2007/084153 | A2 | 7/2007 |

OTHER PUBLICATIONS

International Search Report for European Patent Office application EP09252526 (Jun. 9, 2011).
Uludag et al."Biometric Template Selection and Update: A Case Study in Fingerprints", Pattern Recognition 37:1533-1542 (Jul. 2004).

* cited by examiner

*Primary Examiner* — Toan N Pham
*Assistant Examiner* — Fekadeselassie Girma
(74) *Attorney, Agent, or Firm* — Kilpatrick Townsend & Stockton LLP

(57) ABSTRACT

A biometric authentication system 10 includes an IC card 100 including a reading unit 110 sending generation information back to a terminal and a writing unit 111 writing biometric information in a storage area indicated in a write instruction, and a terminal 200 including a card generation acquisition unit 210 receiving from the IC card the generation information, a device generation acquisition unit 211 receiving from a biometric authentication device the generation information, a biometric information acquisition unit 212 receiving biometric information from the biometric authentication device 300, a first write instruction unit 213 identifying a storage area of the same generation as the generation of the biometric authentication device and transmitting a write instruction of the biometric information to the IC card, and a second write instruction unit 214 transmitting a write instruction for a storage area of the oldest generation to the IC card.

18 Claims, 13 Drawing Sheets

FIRST POCKET

| ITEM | DATA |
|---|---|
| POCKET NUMBER 1 | 1 |
| GENERATION 1 | 1 |
| BIOMETRIC INFORMATION 1 | DATA OF XX BYTES |
| RETRY COUNTER 1 | 10 |

SECOND POCKET

| ITEM | DATA |
|---|---|
| POCKET NUMBER 2 | 2 |
| GENERATION 2 | 2 |
| BIOMETRIC INFORMATION 2 | DATA OF XX BYTES |
| RETRY COUNTER 2 | 10 |

FLAG TABLE

| ITEM | DATA |
|---|---|
| CLOSURE FLAG | 0 |
| UPDATE ENABLE/DISABLE FLAG | 0 |

AUTHENTICATION DEVICE INFORMATION

| ITEM | DATA |
|---|---|
| AUTHENTICATION DEVICE GENERATION | 3 |

CARD INFORMATION

| ITEM | DATA |
| --- | --- |
| FIRST POCKET GENERATION | 1 |
| SECOND POCKET GENERATION | 2 |
| CLOSURE FLAG | 0 |
| UPDATE ENABLE/DISABLE FLAG | 0 |

※GENERATION:0→NOT YET REGISTERED 1~ →GENERATION NUMBER
※CLOSURE FLAG:0→NOT CLOSED 1→CLOSED
※UPDATE ENABLE/DISABLE FLAG:0→UPDATE ENABLED 1→UPDATE DISABLED 9→ALREADY DELETED

FIG. 5A

AUTHENTICATION DEVICE GENERATION INFORMATION

| ITEM | DATA |
| --- | --- |
| AUTHENTICATION DEVICE GENERATION | 3 |

※GENERATION:0→NOT YET REGISTERED 1~ →GENERATION NUMBER

FIG. 5B

BIOMETRIC INFORMATION

| ITEM | DATA |
| --- | --- |
| BIOMETRIC INFORMATION | DATA OF XX BYTES |

FIG. 5C

REGISTERED DATA

| ITEM | DATA |
| --- | --- |
| GENERATION | 3 |
| BIOMETRIC INFORMATION | DATA OF XX BYTES |
| UPDATE ENABLE/DISABLE FLAG | 0 |

FIG. 5D

WRITE TARGET POCKET INFORMATION

| ITEM | DATA |
| --- | --- |
| WRITE TARGET POCKET | 1 |

FIG. 5E

CARD INFORMATION — 20

| ITEM | DATA |
|---|---|
| FIRST POCKET GENERATION | 1 |
| SECOND POCKET GENERATION | 2 |
| CLOSURE FLAG | 0 |

※GENERATION:0→NOT YET REGISTERED 1~ →GENERATION NUMBER
※CLOSURE FLAG:0→NOT CLOSED 1→CLOSED

FIG. 9A

AUTHENTICATION DEVICE GENERATION INFORMATION — 21

| ITEM | DATA |
|---|---|
| AUTHENTICATION DEVICE GENERATION | 1 |

※GENERATION:0→NOT YET REGISTERED 1~ →GENERATION NUMBER

FIG. 9B

CHECK TARGET POCKET INFORMATION — 22

| ITEM | DATA |
|---|---|
| CHECK TARGET POCKET | 1 |

FIG. 9C

BIOMETRIC INFORMATION (BIOMETRIC AUTHENTICATION DEVICE) — 23

| ITEM | DATA |
|---|---|
| BIOMETRIC INFORMATION | DATA OF XX BYTES |

FIG. 9D

BIOMETRIC INFORMATION IN POCKET — 24

| ITEM | DATA |
|---|---|
| BIOMETRIC INFORMATION | DATA OF XX BYTES |

FIG. 9E

CHECK TOLERANCE VALUE — 25

| ITEM | DATA |
|---|---|
| RETRY COUNTER | 10 |

FIG. 9F

BIOMETRIC AUTHENTICATION METHOD, BIOMETRIC AUTHENTICATION SYSTEM, IC CARD, AND TERMINAL

CROSS-REFERENCE TO RELATED APPLICATIONS

The present application claims priority from Japanese Patent Application No. 2008-291287 filed on Nov. 13, 2008 and No. 2009-176469 filed on Jul. 29, 2009, the entire contents of which are hereby herein incorporated by reference.

BACKGROUND

1. Field of the Invention

The present invention relates to a biometric authentication method, a biometric authentication system, an IC card, and a terminal, and more particularly to a technique of enabling providing a transition period during which old and new biometric authentication devices coexist upon updating of the biometric authentication devices, enabling reduction of burden on device providers caused by changeover of the devices and on IC card users who are required to update their biometric information, and enabling performing an authentication process even during the transition period. The present invention also relates to a technique of enabling situational control of an IC card, for example allowing deletion of biometric information for an IC card that has been invalidated for use once performing an authentication process using the card is prohibited, enabling reduction of the burden and cost of IC card administration.

2. Related Art

In recent years, along with development of a network society, identity verification in remote transactions is becoming more and more important. Password authentication is currently widely used, however, the vulnerability of password-based authentication schemes due to the fact that the number of digits of the password is small is noted. In view of this situation, attention is focused on biometric authentication as an alternative. Illustrative techniques of biometric authentication are proposed as shown below.

For example, an information processing system including an information processing device performing identity verification of a user using authentication information of the user stored in a storage device supplied to each user, and when identity verification is successful transmitting to an external device use information required for using the external device and the authentication information stored in the storage device is proposed. The storage device stores biometric characteristics information of a user. The information processing device has a reading means reading information stored in the storage device, an authentication means performing identity verification based on the biometric characteristics information read by the reading means, a transmitting means transmitting the use information and the authentication information to the external device when the identity verification by the authentication means is determined successful. See Japanese Patent Application Laid-open Publication No. 2005-38257.

Also proposed is a biometric authentication device that reads a plurality of pieces of biometric information registered in a user's IC card and performs identity verification through a combination of biometric authentications on the pieces of registered biometric information as read out. The biometric authentication device has a reading means reading an IC card in which pieces of biometric information of a user are registered beforehand, an operating means including a display unit displaying a transaction guidance screen and an input unit allowing input by an user, and a biometric authentication means reading a user's biometric information and performing biometric authentication. A transaction item of interest is selected from among the transaction items displayed on the display unit by operating the input unit, then, biometric authentication is performed on the user based on the pieces of biometric information registered in the IC card by the biometric authentication means. The biometric authentication on the user is repeatedly performed until an authentication rate as a result of the biometric authentication reaches the authentication rate set for the selected transaction item. See Japanese Patent Application Laid-open Publication No. 2007-193476.

It is required of a biometric authentication technology that, in response to changes in biometric information through variation of a living body over time, improvement in a biometric sensor technology such as an increase in the number of camera pixels and improvements in image analyzing capacity, and the like, hardware and/or software for a biometric authentication device are updated as appropriate. On the other hand, since an image format of a living body is determined depending on the hardware/software configuration of the biometric authentication device, a particular biometric authentication device and particular biometric information used for authentication by the same are used in combination. Consequently, when the hardware/software configuration of the biometric authentication device is changed, the biometric information for authentication needs to be changed accordingly.

In a system in which biometric information as a reference for authentication is stored in an IC card and biometric information read from a biometric sensor is checked against the reference stored in the IC card, along with the change or the like in the above-mentioned biometric authentication device, the biometric information registered in the IC card must be changed as well. However, it is extremely difficult to carry out changeover of biometric information stored in a user's IC card corresponding to change/update of the biometric authentication device in a practical sense.

In view of the above, there is demand for proposal of a technique that, while avoiding changeover of all the devices, burden on a provider of a biometric authentication device and on a user for updating biometric information in an IC card in correspondence with a new device can be reduced, and authentication processing is enabled even when biometric information for a new device is not yet registered during a transition period while an old device is being replaced with the new one.

Further, in the case that use of an IC card is completely invalidated due to some event such as authentication failure after a predetermined number of attempts, it is possible that the biometric information stored in the invalidated IC card cannot be deleted. In the case that this kind of IC card is discarded or stored, it is necessary to enable deletion of the biometric information in the IC card so as to reduce the risk of leakage of the biometric information.

SUMMARY

The present invention is conceived in view of the above and other problems, and provides a novel technique of enabling providing a transition period when old and new biometric authentication devices coexist upon updating of the biometric authentication devices, enabling reduction of burden on device providers caused by changeover of the devices and on IC card users who are required to update their biometric information, and enabling performing an authentication process even during the transition period.

Additionally, the present invention provides a novel technique of enabling situational processing control of an IC card, that is, control of processing according to the situation, such as allowing deletion of biometric information from an IC card that has been invalidated once performing an authentication process using the card is prohibited, enabling reduction of the burden and cost of IC card administration.

In a biometric authentication method according to an aspect of the present invention, an IC card including an operation unit, a communication unit, and a storage unit, and a terminal implements the following processes.

The storage unit of the IC card includes storage areas each stores generation information of a biometric authentication device and biometric information corresponding to a generation indicated by the generation information for multiple generations. In the IC card the operation unit receives from the terminal a card information request via the communication unit, reads the generation information of each storage area of the respective storage areas for the multiple generations from the storage unit, and sends the generation information back to the terminal.

In the terminal the operation unit transmits the card information request requesting stored information in the storage areas to the IC card via the communication unit, receives the generation information of each of the storage areas from the IC card, and stores the generation information in the storage unit.

In the terminal the operation unit transmits a request for the generation information to the biometric authentication device via the communication unit, receives the generation information from the biometric authentication device, and stores the generation information in the storage unit.

In the terminal the operation unit transmits a request for the biometric information of a registration target to the biometric authentication device via the communication unit, receives the biometric information of the registration target from the biometric authentication device, and stores the biometric information in the storage unit.

In the terminal the operation unit reads the generation information of the biometric authentication device from the storage unit and the generation information of each of the storage areas, checks the generation information of the biometric authentication device against the generation information of each of the storage areas, identifies a storage area of the same generation as the generation of the biometric authentication device, and transmits an instruction for writing the biometric information of the registration target in the thus-identified storage area to the IC card via the communication unit.

In the terminal, when a storage area of the same generation as the generation of the biometric authentication device is not identified after checking the generation information of the biometric authentication device against the generation information of each of the storage areas, the operation unit checks the generation information of the respective storage areas against each other, identifies the storage area of the oldest generation, and transmits an instruction for writing the biometric information of the registration target in the thus-identified storage area to the IC card via the communication unit.

In the IC card the operation unit receives the instruction for writing the biometric information from the terminal via the communication unit, and writes the biometric information of the registration target and the generation information of the biometric authentication device in the storage area indicated in the instruction for writing.

In the biometric authentication method, it is possible that in the IC card the storage unit stores an update enable/disable flag indicating whether or not the biometric information stored in the storage area is allowed to be updated. In this case, in the terminal the operation unit transmits a request for inquiring about the update enable/disable flag to the IC card via the communication unit, receives information on the update enable/disable flag from the IC card, and, when the information on the update enable/disable flag indicates that the update is disabled, aborts writing of the biometric information in the IC card.

It is also possible that in the IC card, when the operation unit receives any of the instruction for writing the biometric information and an instruction for deleting the biometric information from the terminal via the communication unit, the operation unit deletes the generation information of the biometric authentication device stored in the storage area indicated in the write instruction or the delete instruction, writes or deletes the biometric information after deleting the generation information, and stores the generation information of the biometric authentication device included in the write instruction in the storage area after writing the biometric information.

In a biometric authentication method according to another aspect of the present invention, an IC card including an operation unit, a communication unit, and a storage unit, and a terminal implements the following processes.

The storage unit of the IC card includes storage areas each storing generation information of a biometric authentication device and biometric information corresponding to a generation indicated by the generation information for multiple generations. In the IC card the operation unit receives from the terminal a card information request via the communication unit, reads the generation information of each storage area of the respective storage areas for the multiple generations from the storage unit, and sends the generation information back to the terminal.

In this case, in the terminal the operation unit transmits the card information request requesting stored information in the storage areas to the IC card via the communication unit, receives the generation information of each of the storage areas from the IC card, and stores the generation information in the storage unit.

In the terminal the operation unit transmits a request for the generation information to the biometric authentication device via the communication unit, receives the generation information from the biometric authentication device, and stores the generation information in the storage unit.

In the terminal the operation unit transmits a request for the biometric information of the authentication target to the biometric authentication device via the communication unit, receives the biometric information of the authentication target from the biometric authentication device, and stores the biometric information in the storage unit.

In the terminal the operation unit reads the generation information of the biometric authentication device from the storage unit and the generation information of each of the storage areas, checks the generation information of the biometric authentication device against the generation information of each of the storage areas, identifies a storage area of the same generation as the generation of the biometric authentication device, and transmits an instruction for checking the biometric information of an authentication target against stored in the thus-identified storage area to the IC card via the communication unit.

In the IC card the operation unit receives the instruction for checking from the terminal via the communication unit, checks the biometric information of the authentication target in the instruction for checking against the biometric information stored in the storage area indicated in the instruction for checking, and sends a result of the checking back to the terminal.

In the above aspect of the biometric authentication method, it is possible that, in the terminal, when a storage area of the same generation as the generation of the biometric authentication device is not identified after checking the generation information of the biometric authentication device against the generation information of each of the storage areas, the operation unit outputs a message requesting registration of the biometric information corresponding to the generation of the biometric authentication device to an output interface.

In the above aspect of the biometric authentication method, it is possible that in the terminal, when a storage area of the same generation as the generation of the biometric authentication device is not identified after checking the generation information of the biometric authentication device against the generation information of each of the storage areas, the operation unit identifies the storage area of a generation prior to the generation of the biometric authentication device by a predefined number of generations, and transmits an instruction for checking the biometric information stored in the thus-identified storage area against the biometric information of the authentication target to the IC card via the communication unit.

In the above aspect of the biometric authentication method, it is possible that in the IC card the storage unit stores a retry counter indicating an allowed number of times that, for each of the storage areas for the multiple generations, the biometric information stored in the storage area and the biometric information of the authentication target are determined to be inconsistent after the checking.

In this case, in the IC card, when the biometric information stored in the storage area is inconsistent with the biometric information of the authentication target after checking the biometric information stored in the storage area indicated in the instruction for checking against the biometric information of the authentication target included in the instruction for checking, the operation unit decrements the retry counter of the storage area by a predefined value.

Further, in the IC card the operation unit checks the retry counter of the storage area against a predefined reference value, and, when it is detected that the retry counter is equal to or less than the predefined reference value, sets an invalidated flag indicating that the IC card is invalidated to the storage unit.

On the other hand, in the terminal the operation unit transmits a request for inquiring whether or not the invalidated flag is set to the IC card via the communication unit, receives information on setting of the invalidated flag from the IC card, and, when the information on the setting of the invalidated flag indicates that the invalidated flag is set, aborts processing the IC card.

It is possible that in the IC card the storage unit stores a retry counter indicating an allowed number of times that, for each of the storage areas for the multiple generations, the biometric information stored in the storage area and the biometric information of the authentication target are determined to be inconsistent after the checking.

In this case, it is possible that in the IC card, when the biometric information stored in the storage area is inconsistent with the biometric information of the authentication target after checking the biometric information stored in the storage area indicated in the instruction for checking against the biometric information of the authentication target included in the instruction for checking, the operation unit decrements the retry counter of the storage area by a predefined value, and in the IC card the operation unit checks the retry counter of each of the storage areas for the multiple generations against a predefined reference value, and, when it is detected that any of the retry counters is equal to or less than the predefined reference value, sets an invalidated flag indicating that authentication on the IC card is invalidated to the storage unit.

In this case, it is possible that in the terminal the operation unit transmits a request for inquiring whether or not the invalidated flag is set to the IC card via the communication unit, receives information on setting of the invalidated flag from the IC card, and, when the information on the setting of the invalidated flag indicates that the invalidated flag is set, aborts processing the IC card.

It is also possible that in the IC card the operation unit detects whether or not the invalidated flag is set in the storage unit on receiving the instruction for checking from the terminal, and when the invalidated flag is detected, sends a notification of rejecting authentication back to the terminal, and exits a process.

In the IC card, the storage unit may store an update enable/disable flag indicating whether or not the biometric information stored in the storage area is allowed to be updated with the invalidated flag.

In this case, it is possible that in the terminal the operation unit transmits a request for inquiring whether or not the update enable/disable flag is set in response to an instruction for updating the biometric information through an input interface to the IC card via the communication unit, receives information on setting of the update enable/disable flag from the IC card, and when the information on the setting of the update enable/disable flag indicates that updating is disabled, aborts updating the biometric information on the IC card.

It is possible that in the IC card the operation unit, when the invalidated flag is set, rejects an authentication request from the terminal, accepts a request for updating or deleting the biometric information from the terminal, and updates or deletes the biometric information.

It is also possible that in the terminal the operation unit does not transmit a request for inquiring whether or not the update enable/disable flag is set in response to an instruction for deleting the biometric information through the input interface to the IC card, and sends an instruction for deleting the biometric information to the IC card.

It is possible that in the IC card, when the operation unit receives from the terminal an instruction for writing the biometric information via the communication unit, the operation unit determines whether or not both the generation information and the biometric information are included in the instruction for writing, and when any of the generation information and the biometric information is not included in the instruction for writing, aborts writing in response to the instruction for writing.

It is also possible that in the IC card when the operation unit receives an instruction for deleting the biometric information from the terminal via the communication unit, the operation unit deletes the generation information in the storage areas of all generations regardless of which storage area is indicated in the instruction for deleting, deletes the biometric information after deleting the generation information, and stores information indicating that the deleting is completed in the storage area after deleting the biometric information.

Furthermore, a biometric authentication system according to yet another aspect of the present invention is a computer system including an IC card and a terminal. The IC card includes an operation unit, a communication unit, a storage unit including storage areas each storing generation information of a biometric authentication device and biometric information corresponding to a generation indicated by the generation information for multiple generations, a reading unit, in the operation unit, receiving from the terminal a card information request via the communication unit, reading the generation information of each storage area of the respective storage areas for the multiple generations from the storage unit, and sending the generation information back to the terminal, and a checking unit, in the operation unit, receiving the instruction for checking from the terminal via the communication unit, checking the biometric information of an authentication target in the instruction for checking against the biometric information stored in the storage area indicated in the instruction for checking, and sending a result of the checking back to the terminal.

The terminal includes an operation unit, a communication unit, a storage unit, a card generation acquisition unit, in the operation unit, transmitting the card information request requesting stored information in the storage areas to the IC card via the communication unit, receiving the generation information of each of the storage areas from the IC card, and storing the generation information in the storage unit, a device generation acquisition unit, in the operation unit, transmitting a request for the generation information to the biometric authentication device via the communication unit, receiving the generation information from the biometric authentication device, and storing the generation information in the storage unit, a biometric information acquisition unit, in the operation unit, transmitting a request for the biometric information of the authentication target to the biometric authentication device via the communication unit, receiving the biometric information of the authentication target from the biometric authentication device, and storing the biometric information in the storage unit, and a check instruction unit, in the operation unit, reading the generation information of the biometric authentication device from the storage unit and the generation information of each of the storage areas, checking the generation information of the biometric authentication device against the generation information of each of the storage areas, identifying a storage area of the same generation as the generation of the biometric authentication device, and transmitting an instruction for checking the biometric information of the authentication target against the biometric information stored in the thus-identified storage area to the IC card via the communication unit.

Further, an IC card according to a further aspect of the present invention comprises an operation unit;

a communication unit;

a storage unit including storage areas each storing generation information of a biometric authentication device and biometric information corresponding to a generation indicated by the generation information for multiple generations;

a reading unit, in the operation unit, receiving from the terminal a card information request via the communication unit, reading the generation information of each storage area of the respective storage areas for the multiple generations from the storage unit, and sending the generation information back to the terminal; and a checking unit, in the operation unit, receiving the instruction for checking from the terminal via the communication unit, checking the biometric information of an authentication target in the instruction for checking against the biometric information stored in the storage area indicated in the instruction for checking, and sending a result of the checking back to the terminal.

Furthermore, a terminal according to a yet further aspect of the present invention comprises an operation unit;

a communication unit;

a storage unit;

a card generation acquisition unit, in the operation unit, transmitting the card information request requesting stored information in the storage areas to the IC card via the communication unit, receiving the generation information of each of the storage areas from the IC card, and storing the generation information in the storage unit;

a device generation acquisition unit, in the operation unit, transmitting a request for the generation information to the biometric authentication device via the communication unit, receiving the generation information from the biometric authentication device, and storing the generation information in the storage unit;

a biometric information acquisition unit, in the operation unit, transmitting a request for the biometric information of an authentication target to the biometric authentication device via the communication unit, receiving the biometric information of the authentication target from the biometric authentication device, and storing the biometric information in the storage unit; and a check instruction unit, in the operation unit, reading the generation information of the biometric authentication device from the storage unit and the generation information of each of the storage areas, checking the generation information of the biometric authentication device against the generation information of each of the storage areas, identifying a storage area of the same generation as the generation of the biometric authentication device, and transmitting an instruction for checking the biometric information of the authentication target against the biometric information stored in the thus-identified storage area to the IC card via the communication unit.

The above and other problems and solutions thereto disclosed herein will become apparent from the following description of the embodiments of the present invention with reference to the accompanying drawings.

According to the present invention, it is possible to provide a transition period when old and new biometric authentication devices coexist upon updating the biometric authentication devices, to reduce burden on device providers caused by changeover of the devices and on IC card users who are required to update their biometric information, and to perform an authentication process even during the transition period. Further, it is possible to exercise situational control of an IC card, such as allowing deletion of biometric information from an IC card that has been invalidated once performing an authentication process using the card is prohibited, reducing the burden and cost of IC card administration.

BRIEF DESCRIPTION OF THE DRAWINGS

FIG. 2A shows an example of a first pocket in the present embodiment;

FIG. 2B shows an example of a second pocket in the present embodiment;

FIG. 2C shows an example of a flag table in the present embodiment;

FIG. 2D shows an example of authentication device information in the present embodiment;

FIG. 5A shows a first example of card information in the present embodiment;

FIG. 5B shows a first example of authentication device generation information in the present embodiment;

FIG. 5C shows a first example of biometric information in the present embodiment;

FIG. 5D shows a first example of registered data in the present embodiment;

FIG. 5E shows a first example of write destination pocket information in the present embodiment;

FIG. 9A shows a second example of card information in the present embodiment;

FIG. 9B shows a second example of authentication device generation information in the present embodiment;

FIG. 9C shows an example of pocket-to-be-checked information in the present embodiment;

FIG. 9D shows an example of biometric information in the biometric authentication device in the present embodiment;

FIG. 9E shows an example of biometric information in the pocket in the present embodiment;

FIG. 9F shows an example of a retry counter in the present embodiment;

DETAILED DESCRIPTION OF THE EMBODIMENTS

System Configuration

Figure 1:
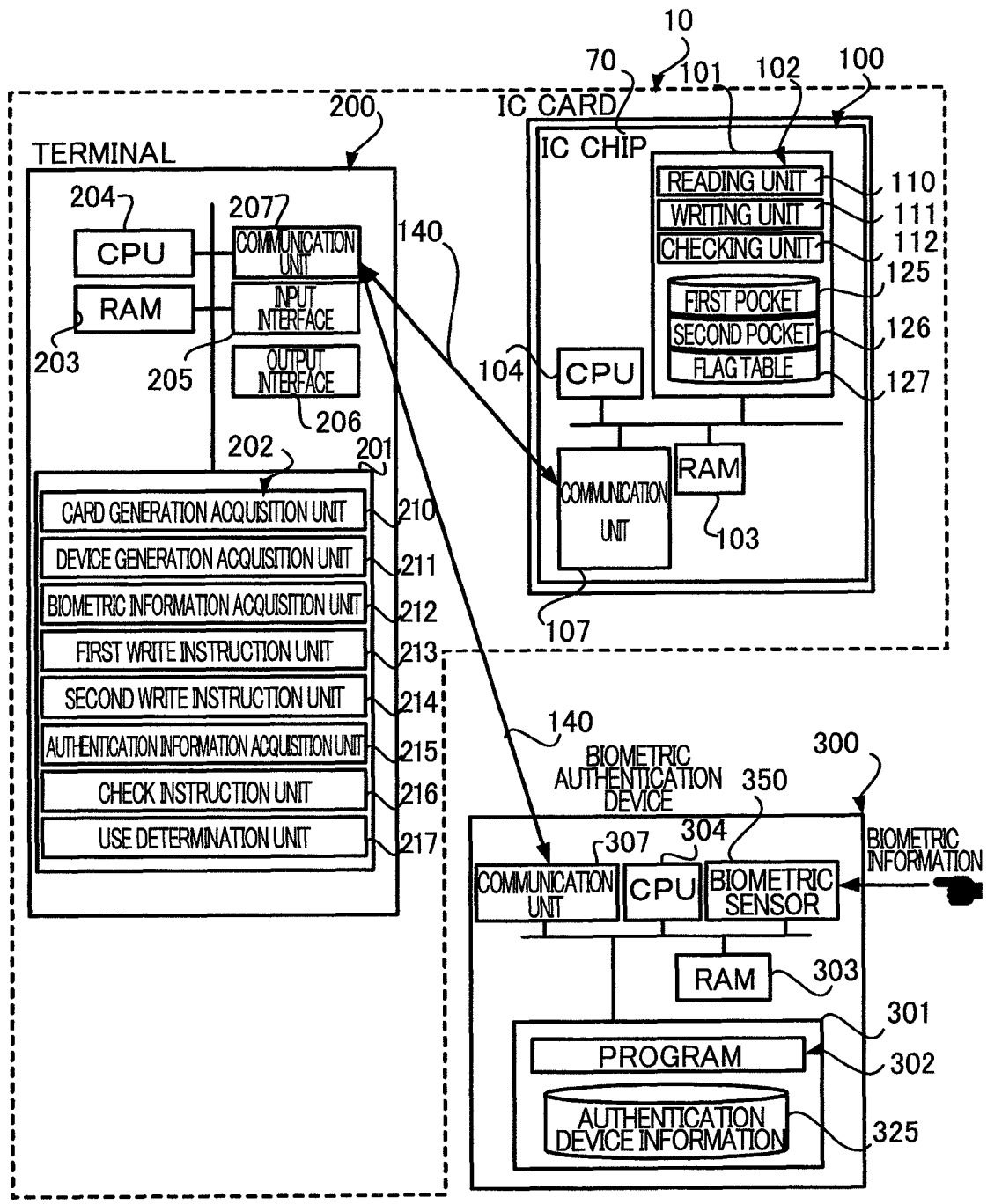
FIG. 1 is a network configuration diagram of a biometric authentication system according to an embodiment of the present invention.

The embodiments of the present invention are described referring to the drawings hereinbelow. FIG. 1 is a network configuration diagram of a biometric authentication system 10 according to an embodiment of the present invention. The biometric authentication system 10 (hereinafter referred to as "system 10") according to the present embodiment is a computer system that enables providing a transition period when old and new biometric authentication devices coexist on updating the biometric authentication device 300, reduction of burden on device providers caused by changeover of the devices and on IC card users who are required to update their biometric information, and performing an authentication process even during the transition period. Further, the system 10 is a computer system that enables situational control of an IC card, for example allowing election of biometric information from an IC card that has been invalidated for use once performing an authentication process using the card is prohibited, reducing the burden and cost of IC card administration.

In order to achieve the above, the biometric authentication system 10 according to the present embodiment includes an IC card 100, a terminal 200 such as a teller terminal provided at financial facilities and the like requiring a biometric authentication process, and a biometric authentication device 300 provided for example at financial facilities and the like. The IC card 100 and the terminal 200, and the terminal 200 and the biometric authentication device 300, are communicatively coupled through a network 140 respectively.

The IC card 100 included in the system 10 as mentioned above has an IC chip 70 reading a program 102 from a storage unit 101 such as non-volatile memory, loading the program 102 into a RAM 103, and executing the same by a CPU 104 as an operation unit so as to implement a function of performing a biometric authentication method. The IC chip 70 is contained in an outer package such as a plastic card to form the IC card 100. Hereinafter, operation of the IC chip 70 will be described as operation of the IC card 100.

The CPU 104, managing overall control of the IC card 100, implements various functions of the IC card 100 by reading a program stored in the storage unit 101, loading the program into the RAM 103, and executing the same, the program including codes for realizing various operations of the present embodiment. The RAM 103 is constructed with a semiconductor memory device such as a volatile memory. The storage unit 101 is constructed with a semiconductor memory device such as a non-volatile memory. Further, the IC card 100 includes a communication unit 107 performing communication with the terminal 200 via the network 140.

The storage unit 101 stores the program 102 including codes for realizing various operations of the present embodiment, a first pocket 125 and a second pocket 126 as storage areas, and a flag table 127. Each piece of the information 125-127 will be described in detail below.

Next, operational units constructed and retained in the IC card 100 based on the program 102 will be described. It is to be noted that the IC card 100 stores each piece of the information 125-127 in the storage unit 101.

The IC card 100 has a reading unit 110 implemented by the operation unit (CPU) 104 that receives a card information request from the terminal 200 via the communication unit 107, reads pieces of generation information in the respective storage areas 125, 126 prepared for multiple generations in the storage unit 101, and sends the read generation information to the terminal 200.

Further, the IC card 100 has a writing unit 111 implemented by the operation unit 104 that receives an instruction for writing the biometric information from the terminal 200 via the communication unit 107, and writes the biometric information of the user to be registered and the generation information of the biometric authentication device 300 in the storage area designated by the write instruction.

Alternatively, the following construction may be employed in which, when the writing unit 111 implemented by the operation unit 104 receives a write instruction for the biometric information or an instruction for deleting the biometric information from the terminal 200 via the communication unit 107, the writing unit 111 deletes the generation information of the biometric authentication device 300 stored in the storage area designated by the write instruction or the deletion instruction, writes or deletes the biometric information after the deletion of the generation information, and after the writing of the biometric information stores the generation information of the biometric authentication device 300 in the write instruction into the corresponding storage area.

Further, it is also possible that the IC card 100 has a checking unit 112 implemented by the operation unit 104 that receives an instruction for checking (a checking instruction) from the terminal 200 via the communication unit 107, checks the biometric information stored in the storage area designated in the checking instruction against the biometric information of the target of authentication in the checking instruction, and sends the check result to the terminal 200.

It is also possible that, when the result of checking the biometric information stored in the storage area designated in the checking instruction against the biometric information of the authentication target in the checking instruction indicates inconsistency between the biometric information in the storage area and the biometric information of the authentication target in the check instruction, the checking unit 112 implemented by the operation unit 104 subtracts a predefined value from the retry counter set in the corresponding storage area.

It is also possible that the checking unit 112 implemented by the operation unit 104 checks the retry counter of the storage area against the predefined reference value, and, if the retry counter is determined to be less than or equal to the predefined reference value, sets a flag indicating that the IC card 100 is invalidated (hereinafter "invalidated flag") in the storage unit 101.

Further, it is possible that the checking unit 112 implemented by the operation unit 104 checks the retry counters set in the respective storage areas for the multiple generations against the predefined reference value, and, if any one of the retry counters of the respective storage areas is determined to be less than or equal to the predefined reference value, sets in the storage unit 101 the invalidated flag indicating authentication process cannot be performed on the IC card 100.

It is also possible that, when the writing unit 111 implemented by the operation unit 104 receives a write instruction for the biometric information from the terminal 200 via the communication unit 107, the writing unit 111 determines whether or not both the generation information and the biometric information are included in the write instruction, and, if it is determined that either the generation information or the biometric information is not included in the write instruction, aborts writing according to the write instruction.

Further, it is possible that, when the writing unit 111 implemented by the operation unit 104 receives a deletion instruction for the biometric information from the terminal 200 via the communication unit 107, regardless of which storage area is designated in the deletion instruction, the writing unit 111 deletes the generation information in the storage areas for all the generations, deletes the biometric information after this deletion of the generation information, and after deletion of the biometric information stores in the storage area information indicating that the deletion is completed.

It is also possible that, when the checking unit 112 implemented by the operation unit 104 determines the invalidated flag is set, the checking unit 112 denies an authentication request from the terminal 200, and accepts a request for updating or deleting the biometric information from the terminal 200 and performs update or deletion.

The terminal 200 is a computer terminal that reads a program 202 from a storage unit 201 such as a non-volatile memory, loading the program 202 into a RAM 203 and executing the same by a CPU 204 as an operation unit so as to implement, with the IC card 100, a function of performing a biometric authentication method. Further, the terminal 200 has an input interface 205 such as various buttons and a keyboard that are generally provided to a computer, an output interface 206 such as LED lamps and a display, and a communication unit 207 performing communication with the IC card 100 and the biometric authentication device 300 via the network 140. Though not specified in the figures, the communication unit 207 may be either of two types of devices. One is an IC card reader device that communicates with the communication unit 107 of the IC card 100, and another is an NIC (Network Interface Card) performing data communication between the computer terminals via the network 140.

Next, operational units constructed and retained in the terminal 200, for example, based on the program 202, will be described. The terminal 200 has a card generation acquisition unit 210 implemented by the operation unit 204 that transmits a card information request for requesting the stored information in the storage area 125, 126 to the IC card 100 via the communication unit 207, receives from the IC card 100 the generation information of the respective storage areas, and stores the generation information in the storage unit 201.

The terminal 200 also has a device generation acquisition unit 211 implemented by the operation unit 204 that transmits the request for generation information to the biometric authentication device 300 via the communication unit 207, receives the generation information from the biometric authentication device 300, and stores the generation information in the storage unit 201.

Further, the terminal 200 has a biometric information acquisition unit 212 implemented by the operation unit 204 that transmits a request for the biometric information of a target user for registration (hereinafter "registration target") to the biometric authentication device 300 via the communication unit 207, receives the biometric information of the registration target from the biometric authentication device 300, and stores the received biometric information in the storage unit 201.

The terminal 200 further has a first write instruction unit 213 implemented by the operation unit 204 that reads from the storage unit 201 the generation information of the biometric authentication device 300 and the generation information of each of the storage areas, checks the generation information of the biometric authentication device 300 against the generation information of each of the storage areas, identifies a storage area of the same generation as that of the biometric authentication device 300, and transmits an instruction for writing the biometric information of the registration target in the thus-identified storage area to the IC card 100 via the communication unit 207.

The terminal 200 also has a second write instruction unit 214 implemented by the operation unit 204 that, when a storage area of the same generation as that of the biometric authentication device 300 is not identified as a result of checking the generation information of the biometric authentication device 300 against the generation information of the respective storage areas, checks each piece of the generation information of the respective storage areas, identifies the storage area having the oldest generation, and transmits an instruction for writing the biometric information of the registration target in the thus-identified storage area to the IC card 100 via the communication unit 207.

It is possible that the first write instruction unit 213 transmits a request for inspecting an update enable/disable flag to the IC card 100 via the communication unit 207, receives the information on the update enable/disable flag from the IC card 100, and, when the information on the update enable/disable flag indicates that update is disabled, aborts writing of the biometric information in the IC card 100.

Further, it is possible that the terminal 200 has an authentication information acquisition unit 215 implemented by the operation unit 204 that transmits a request for the biometric information of the authentication target to the biometric authentication device 300 via the communication unit 207, receives the biometric information of the authentication target from the biometric authentication device 300, and store the same in the storage unit 201.

It is also possible that the terminal 200 has a check instruction unit 216 implemented by the operation unit 204 that reads the generation information of the biometric authentication device 300 and the generation information of the respective storage areas from the storage unit 201, checks the generation information of the biometric authentication device 300 against the pieces of generation information of the respective storage areas, identifies a storage area of the same generation as the generation of the biometric authentication device 300, and transmits an instruction for checking the biometric information stored in the thus-identified storage area against the biometric information of the authentication target to the IC card 100 via the communication unit 207.

It is possible that, when a storage area of the same generation as that of the biometric authentication device 300 is not identified as a result of checking the generation information of the biometric authentication device 300 against the generation information of the respective storage areas, the check instruction unit 216 implemented by the operation unit 204 identifies a storage area of a generation earlier by predefined generations than the generation of the biometric authentication device 300, and transmits an instruction for checking the biometric information stored in the thus-identified storage area against the biometric information of the authentication target to the IC card 100 via the communication unit 207.

It is also possible that, when a storage area of the same generation as that of the biometric authentication device 300 is not identified as a result of checking the generation information of the biometric authentication device 300 against the generation information of the respective storage areas, the check instruction unit 216 implemented by the operation unit 204 outputs a message requesting registration of biometric information suitable for the generation of the biometric authentication device 300 to the output interface 206.

Further, it is possible that the terminal 200 has a use determination unit 217 implemented by the operation unit 204 that transmits a request for inspecting whether or not the invalidated flag is set to the IC card 100 via the communication unit 207, receives the information on setting of the invalidated flag from the IC card 100, and, when the information on the invalidated flag setting indicates that the invalidated flag is set, aborts processing of the above IC card 100.

It is also possible that the use determination unit 217 implemented by the operation unit 204 transmits a request for inspecting whether or not the invalidated flag is set to the IC card 100 via the communication unit 207, receives the information on setting of the invalidated flag from the IC card 100, and, when the information on the invalidated flag setting indicates that the invalidated flag is set, aborts an authentication process regarding the above IC card 100.

Here, it is assumed that in the IC card 100 the storage unit 101 stores the update enable/disable flag as well as the invalidated flag. In this case, it is possible that the use determination unit 217 of the terminal 200 implemented by the operation unit 204 transmits a request for inspecting whether or not the update enable/disable flag is set to the IC card 100 via the communication unit 207 in response to the update instruction for the biometric information accepted from the input interface 205, receives the information on setting of the update enable/disable flag from the IC card 100, and, when the information on the setting of the update enable/disable flag indicates that update is disabled, aborts an update process of the above IC card 100.

It is also possible that the use determination unit 217 implemented by the operation unit 204 does not transmits a request for inspecting whether or not the update enable/disable flag is set to the IC card 100 via the communication unit 207 in response to the biometric information deletion instruction accepted from the input interface 205 to the IC card 100, and instructs the IC card 100 to delete the biometric information.

The biometric authentication device 300 reads a program 302 from a storage unit 301 such as a non-volatile memory, loading the program 302 into a RAM 303 and executing the same by a CPU 304 as an operation unit so as to implement a function of performing processes according to various requests from the IC card 100, the terminal 200, and the like. Further, the biometric authentication device 300 can be provided as necessary with an input interface such as various buttons and a keyboard that are generally provided to a computer, an output interface such as LED lamps and a display. The biometric authentication device 300 has a communication unit 307 performing communication with the terminal 200 via the network 140. The above biometric authentication device 300 has a biometric sensor 350 as required to perform as a biometric authentication device. The biometric sensor 350 is a sensor for reading biometric information of a registration target or biometric information of an authentication target, and may be various types of biometric sensors such as a vein pattern sensor, a fingerprint sensor, an iris sensor, and the like.

It is to be noted that each unit 110-112, 210-217 in the devices constituting the above-described system 10 may be implemented as hardware or as a program stored in an appropriate storage unit such as a memory or a HDD (Hard Disk Drive). When implemented as a program, a CPU in each of the devices reads the program from the storage unit, loads it in memory, and executes the same.

—Example of Stored Information—

Here, the information utilized by the biometric authentication system 10 according to the present embodiment will be described. FIGS. 2A-2D respectively show the examples of a first pocket 125, a second pocket 126, a flag table 127, and authentication device information 325.

The first pocket 125 and the second pocket 126 are the storage areas provided in the storage unit 101 of the IC card 100. Each of the storage areas stores the generation information of the biometric authentication device 300 and the biometric information corresponding to the generation indicated by the generation information for each generation in the storage unit 101.

The first pocket 125 and the second pocket 126 are each related to the generation information of the biometric authentication device 300, the biometric information of the user of the corresponding IC card 100, and the data of the retry counter through a key such as a pocket number, for example. The retry counter indicates a number of times that, for each of the storage areas for the multiple generations, results of a check of the biometric information stored in the corresponding storage area against the biometric information of the authentication target, i.e., the user of the IC card 100 are allowed to be inconsistent before the card is invalidated. The retry counter has initially a default value, for example 10 in FIGS. 2A and 2B. When the checking unit 112 of the IC card 100 checks the biometric information stored in the storage area according to the check instruction from the terminal 200 against the biometric information of the authentication target in the check instruction, and determines that the biometric information stored in the storage area and the biometric information of the authentication target are inconsistent, the retry counter is reduced by a predefined value.

The flag table 127 stores a closure flag as an invalidated flag (hereinafter, "closure flag") and an update enable/disable flag. The closure flag is a flag indicating restriction of the processes performed on the corresponding IC card 100. The closure flag is set to the corresponding IC card 100 for indicating that the IC card 100 is invalidated or cannot be authenticated when the checking unit 112 checks the retry counter of the storage area against a predefined reference value and determines that the retry counter is equal to or smaller than the predefined reference value.

The update enable/disable flag is a flag indicating whether or not update of the biometric information stored in the storage area is allowed, and is set for example by the IC card 100 receiving an instruction from the terminal 200. In an IC card 100 in which the update enable/disable flag is set, registration and update of the biometric information are prohibited, although deletion of the biometric information is not prohibited.

—Example of Process Flow 1—

Hereinafter, an actual procedure of the biometric authentication method according to the present embodiment will be described referring to the accompanying figures. It is to be noted that various steps constituting the biometric authentication method to be described below are implemented by programs read into and executed in the respective pieces of memory of the IC card 100, the terminal 200, and the biometric authentication device 300 constituting the system 10. The above programs are constructed with codes for performing the various steps to be described below.

Figure 3:
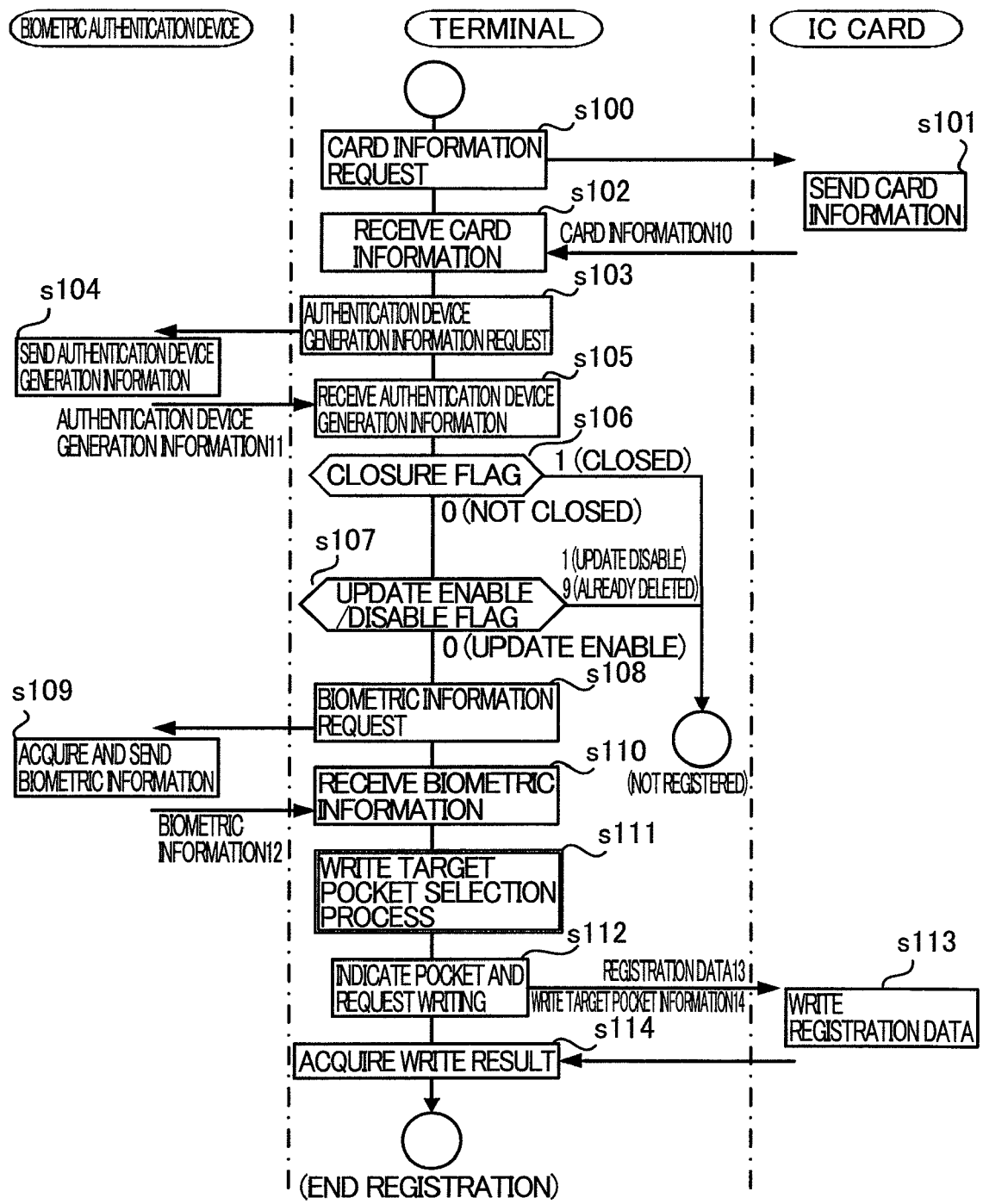
FIG. 3 is a flowchart of an exemplary processing procedure 1 in the present embodiment.

FIG. 3 is a flowchart showing a first example of a processing procedure according to the present embodiment. Here, a process of registering the biometric information on the IC card 100 will be described. In the present example, it is assumed that a user of the IC card 100 visits a window of a financial facility, for example, and requests registration of biometric information on the IC card 100. It is assumed that registering of the biometric information may be performed at such times as initial issue of the IC card 100, when a user gets the intention to use ATMs employing biometric authentication (up until that time biometric information of the user is not registered on the IC card 100), reissue of the IC card 100, and the like. Of course, such assumed situations will depend on the type of business and the kind of business entity that apply the IC card 100 to biometric authentication. The biometric authentication method of the present embodiment can be applied to any situation regardless of difference in, for example, the business category.

For example, a clerk at a window of a financial facility places the IC card 100 of the above user over an IC card reader of the communication unit 207 in the terminal 200. Then, the communication unit 207 of the terminal 200 recognizes that the IC card 100 is present and starts reading of the IC card 100.

At this time, the card generation acquisition unit 210 of the terminal 200 transmits a card information request for the stored information of the first pocket 125 and the second pocket 126 to the IC card 100 via the communication unit 207 (s100). It is to be noted that the card generation acquisition unit 210 may include a request for information on the closure flag and the update enable/disable flag in the above card information request. Alternatively, the use determination unit 217 may request the information on the above flags.

The reading unit 110 of the IC card 100 receives the card information request from the terminal 200 via the communication unit 107, reads the generation information from the respective storage areas for the multiple generations in the storage unit 101, namely from the first pocket 125 and the second pocket 126, and sends the read generation information back to the terminal 200 (s101). At this time, the reading unit 110 may additionally read the stored information in the flag table 127 from the storage unit 101 and send it back to the terminal 200 as well. At this step, s101, the card information sent back to the terminal 200 by the reading unit 110 of the IC card 100 may include, for example, the card information 10 shown in FIG. 5A. The card information 10 includes the following data: the generation of the first pocket indicated by the first pocket 125 (i.e., the generation of the biometric authentication device 300 corresponding to the biometric information stored in the first pocket), the generation of the second pocket indicated by the second pocket 126 (i.e., the generation of the biometric authentication device 300 corresponding to the biometric information stored in the second pocket), the closure flag, and the update enable/disable flag.

The card generation acquisition unit 210 of the terminal 200 receives the card information 10 including the generation information of the respective storage areas of the first pocket 125 and the second pocket 126 and the stored information in the flag table 127 from the IC card 100, and stores the above-received information in the storage unit 201 (s102). Further, the device generation acquisition unit 211 of the terminal 200 transmits a request for the generation information to the biometric authentication device 300 via the communication unit 207 (s103).

The biometric authentication device 300, having received the request, reads the authentication device information 325 from the storage unit 301, and sends the above-read information back to the terminal 200 via the communication unit 307 as authentication device generation information 11 (s104). In the authentication device generation information 11 is included the generation information of the biometric authentication device 300. See FIG. 5B. The device generation acquisition unit 211 of the terminal 200 receives the authentication device generation information 11 including the generation information from the biometric authentication device 300, and stores the above received information in the storage unit 201 (s105).

Then, the use determination unit 217 of the terminal 200 reads setting information of the closure flag received from the IC card 100 and stored in the storage unit 201, and determines whether the closure flag is "1" (closed) or "0" (not closed) (s106). When it is determined the closure flag is "1" indicating "closed" (s106: 1), the use determination unit 217 aborts processing of the corresponding IC card 100, and exits the process.

On the other hand, when it is determined the closure flag is "0" indicating "not closed" (s106: 0), the first write instruction unit 213 of the terminal 200 reads the update enable/disable flag received from the IC card 100 and stored in the storage unit 201, and determines whether the update enable/disable flag is "0" (update enable), "1" (update disable), or "9" (already deleted) (s107). When it is determined the update enable/disable flag is "1" indicating "update disable" or "9" indicating "already deleted" (s107: 1,9), the first write instruction unit 213 aborts writing of the biometric information to the corresponding IC card 100, and exits the process.

On the other hand, if it is determined the update enable/disable flag is "0" indicating "update enable" (s107: 0), the biometric information acquisition unit 212 of the terminal 200 transmits a request for the biometric information of the registration target to the biometric authentication device 300 via the communication unit 207 (s108).

The biometric authentication device 300, having received the request, reads the biometric information on the user, i.e., the registration target with the biometric sensor 350 and retrieves the biometric information. Further, the biometric authentication device 300 sends the biometric information 12 thus retrieved (see FIG. 5C) back to the terminal 200 via the communication unit 307 (s109). The biometric information acquisition unit 212 of the terminal 200 receives the biometric information 12 of the user from the biometric authentication device 300, and stores the above information in the storage unit 201 (s110).

Subsequently, the first write instruction unit 213 of the terminal 200 selects the storage area the biometric information of into which the user is to be written, the first pocket 125 or the second pocket 126 of the IC card 100 (s111). This selection process will be described later in detail with reference to the second example of the process flow. The first write instruction unit 213, having identified the storage area as the write destination, i.e., the pocket at this step, s111, then transmits the instruction for writing the biometric information of the user in the identified storage area to the IC card 100 via the communication unit 207 (s112). In this write instruction are included registration data 13 and write destination pocket information 14 (in the example in FIG. 5E, the write destination pocket of "1" indicates the first pocket 125). As shown in FIG. 5D, the registration data 13 includes the generation information of the biometric authentication device 300 ("3" in the example in the figure), the biometric information of the user, and the update enable/disable flag set by the operator of the terminal 200 through the input interface 205, for example.

The writing unit 111 of the IC card 100 receives an instruction for writing the biometric information (registration data 13 and write destination pocket information 14) from the terminal 200 via the communication unit 107, and performs writing of the biometric information of the user and the generation information of the biometric authentication device 300 in the storage area designated by the write instruction, i.e., the pocket, and writing of the update enable/disable flag in the flag table 127 (s113). At the step s114, the terminal acquires the result of the writing.

At this time, the writing unit 111 deletes the generation information of the biometric authentication device 300 stored in the storage area designated by the instruction for writing the biometric information from the terminal 200 (or an instruction for deleting the biometric information), and, after the deleting of the generation information, writes (or deletes) the biometric information. After writing the above biometric information, the writing unit 111 stores the generation information of the biometric authentication device 300 contained in the write instruction in the corresponding storage area. By adopting the above procedure of writing (or deleting), even when, for example, the IC card 100 is removed from the IC card reader (the communication unit 207) during writing of the biometric information in the IC card 100, creation of a generation gape between the generation information left in the storage area and the biometric information can be avoided. If conversely the biometric information is written first, followed by the generation information, without relying on the above processing procedure, when the IC card 100 is removed from the IC card reader after writing of the biometric information, a situation occurs in which the biometric information is in a new generation whereas the generation information stored in the storage area is in the previous generation. This problem may be specific to the biometric authentication process using an IC card.

—Example of Process Flow 2—

Figure 4:
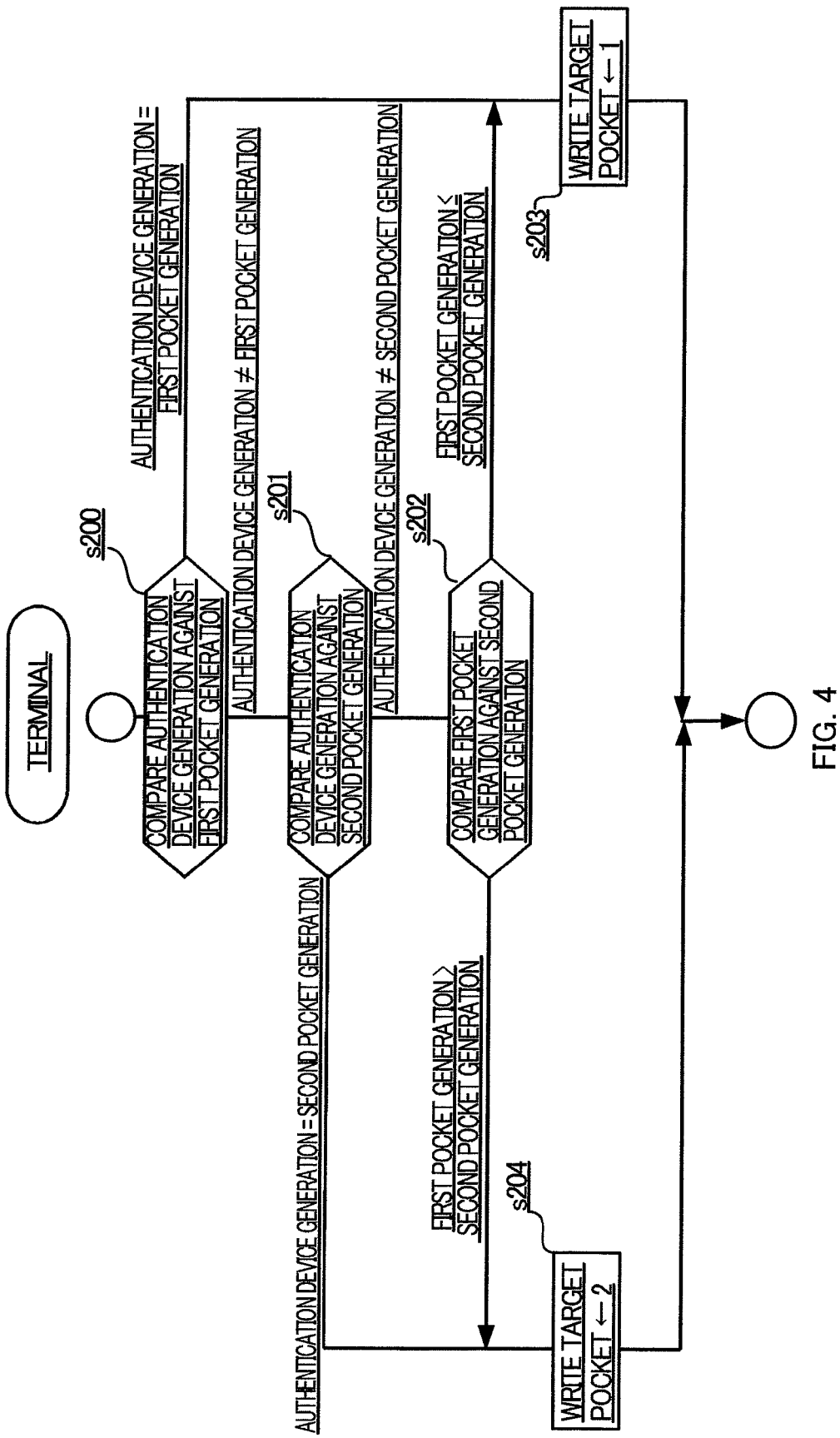
FIG. 4 is a flowchart of an exemplary processing procedure 2 in the present embodiment.

Next, the process at step s111 in the above first example of the process flow will be described. FIG. 4 is a flowchart showing the second processing procedure according to the present embodiment. The first write instruction unit 213 of the terminal 200 selects into which storage area the biometric information of the user is to be written, the first pocket 125 or the second pocket 126 of the IC card 100.

In the above determination, the first write instruction unit 213 reads the generation information of the biometric authentication device 300 ("3" in the example in FIG. 5B) from the storage unit 201 and the generation information of each of the respective storage areas ("1" and "2" in the example of FIG. 5A), and checks the generation information of the biometric authentication device 300 against the generation information of each of the storage areas (s200).

At the step s200, the first write instruction unit 213 compares the generation "3" of the biometric authentication device 300 with the generation "1" of the first pocket 125, and determines whether or not the above generations are the same. If it is determined that the generation of the biometric authentication device 300 and the generation of the first pocket 125 are the same (s200: authentication device generation=the generation of the first pocket), the first write instruction unit 213 determines that the thus-identified storage area, i.e., the first pocket, is the write destination of the biometric information of the user (s203).

However, since, in the above example, the generation of the biometric authentication device 300 and the generation of the first pocket 125 are not the same (s200: authentication device generation the generation of the first pocket), the first write instruction unit 213 then compares the generation "3" of the biometric authentication device 300 with the generation "2" of the second pocket 126, and determines whether or not the above generations are the same (s201). If it is determined that the generation of the biometric authentication device 300 and the generation of the second pocket 126 are the same (s200: authentication device generation=the generation of the second pocket), the first write instruction unit 213 determines that the thus-identified storage area, i.e., the second pocket, is the write destination of the biometric information of the user (s204).

However, since, in the above example, the generation of the biometric authentication device 300 and the generation of the second pocket 126 are not the same (s201: authentication device generation the generation of the second pocket), the first write instruction unit 213 checks the pieces of the generation information of the respective storage areas with each other to determine the old and new among the generations (s202). In the above example, the first write instruction unit 213 compares the generation of the first pocket 125 with the generation of the second pocket 126, determines that the generation of the first pocket 125 is older (s202: the generation of the first pocket is older than the generation of the second pocket), and determines that the first pocket 125 is the write destination of the biometric information of the user (s203).

On the other hand, when it is determined that the generation of the second pocket is older (s202: the generation of the first pocket>the generation of the second pocket), the first write instruction unit 213 determines that the second pocket 126 is the write destination of the biometric information of the user (s204).

—Example 3 of Process Flow—

Figure 6:
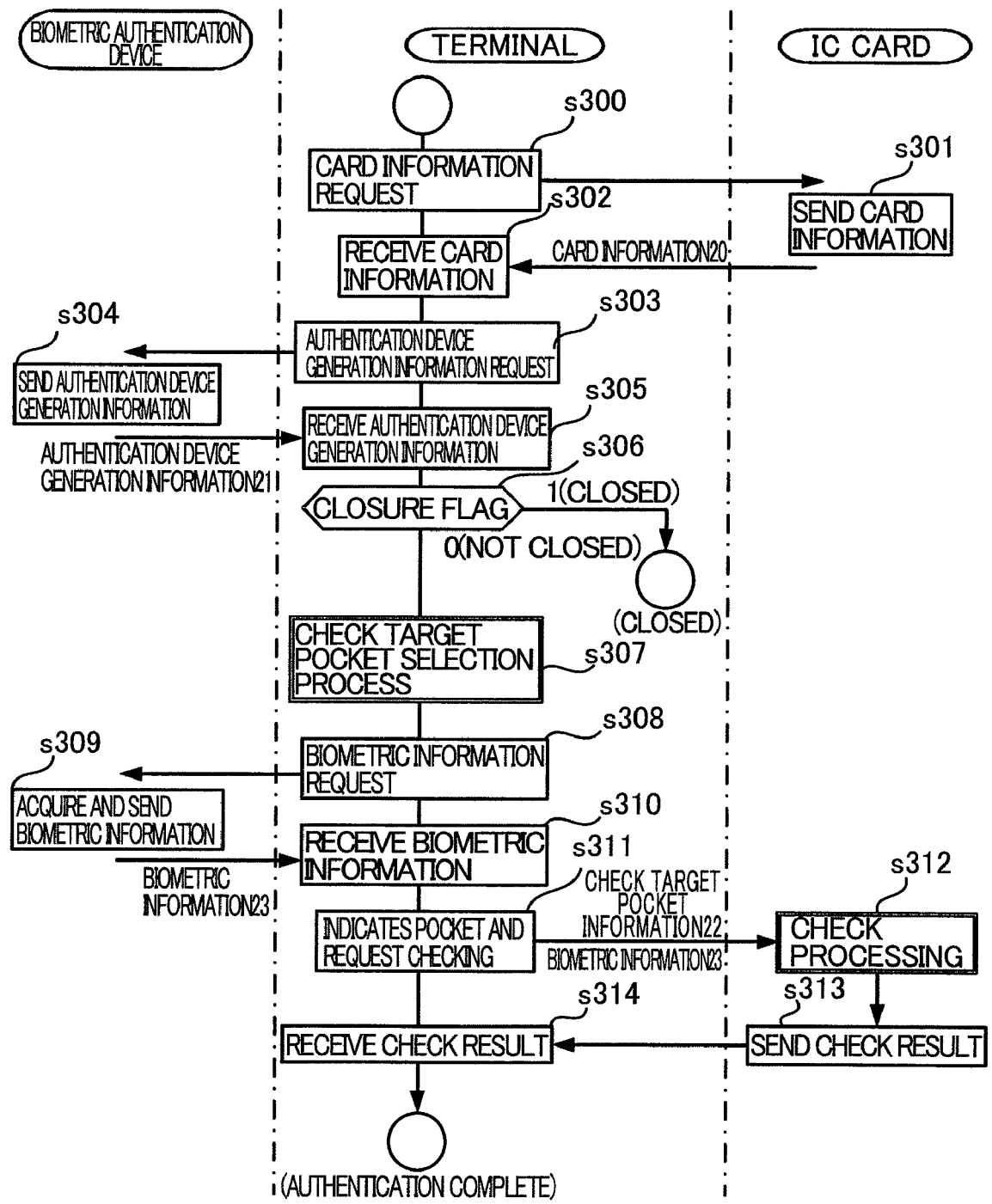
FIG. 6 is a flowchart of an exemplary processing procedure 3 in the present embodiment.

Next, an authentication process for the biometric information will be described. FIG. 6 is a flowchart showing the third processing procedure according to the present embodiment.

This example assumes a situation in which a user of the IC card 100 visits, for example, a window of a financial facility and asks to conduct some sort of business that involves biometric authentication using the IC card 100. For example, a clerk at a window of a financial facility places the IC card 100 of the above user over an IC card reader of the communication unit 207 in the terminal 200. Then, the communication unit 207 of the terminal 200 recognizes that the IC card 100 is present and starts reading of the IC card 100.

At this time, the card generation acquisition unit 210 of the terminal 200 transmits a card information request for the stored information of the first pocket 125 and the second pocket 126 to the IC card 100 via the communication unit 207 (s300). It is to be noted that the card generation acquisition unit 210 may include a request for information on the closure flag and the update enable/disable flag in the above card information request. Alternatively, the use determination unit 217 may request the information on the above flags.

The reading unit 110 of the IC card 100 receives the card information request from the terminal 200 via the communication unit 107, reads the generation information from the respective storage areas for the multiple generations in the storage unit 101, namely from the first pocket 125 and the second pocket 126, and sends the read generation information back to the terminal 200 (s301). At this time, the reading unit 110 may additionally read the stored information in the flag table 127 from the storage unit 101 and send it back to the terminal 200. At this step, s301, the card information sent back to the terminal 200 by the reading unit 110 of the IC card 100 may include, for example, the card information 20 shown in FIG. 9A. The card information 20 includes the following data: the generation of the first pocket indicated by the first pocket 125 (i.e., the generation of the biometric authentication device 300 corresponding to the biometric information stored in the first pocket), the generation of the second pocket indicated by the second pocket 126 (i.e., the generation of the biometric authentication device 300 corresponding to the biometric information stored in the second pocket), and the closure flag.

The card generation acquisition unit 210 of the terminal 200 receives the card information 20 including the generation information of the respective storage areas of the first pocket 125 and the second pocket 126 from the IC card 100 and the stored information in the flag table 127, and stores the above-received information in the storage unit 201 (s302). Further, the device generation acquisition unit 211 of the terminal 200 transmits a request for the generation information to the biometric authentication device 300 via the communication unit 207 (s303).

The biometric authentication device 300, having received the request reads the authentication device information 325 from the storage unit 301, sends the above-read information back to the terminal 200 via the communication unit 307 as authentication device generation information 21 (s304). In the authentication device generation information 21 is included the generation information of the biometric authentication device 300. See FIG. 9B. The device generation acquisition unit 211 of the terminal 200 receives the authentication device generation information 21 including the generation information from the biometric authentication device 300, and stores the received information in the storage unit 201 (s305).

Then, the use determination unit 217 of the terminal 200 reads setting information of the closure flag received from the IC card 100 and stored in the storage unit 201, and determines whether the closure flag is "1" (closed) or "0" (not closed) (s306). If it is determined the closure flag is "1" indicating "closed" (s306: 1), the use determination unit 217 aborts the process on the corresponding IC card 100, and exits the process.

On the other hand, if it is determined the closure flag is "0" indicating "not closed" (s306: 0), the check instruction unit 216 of the terminal 200 reads the generation information of the biometric authentication device 300 from the storage unit 201 and the generation information from the respective storage areas, and determines the biometric information of the authentication target and the storage area against which the biometric information is checked (s307). This determination process will be described referring to the fourth process flow below.

Next, the authentication information acquisition unit 215 of the terminal 200 transmits a request for the biometric information of the user as an authentication target to the biometric authentication device 300 via the communication unit 207 (s308). The biometric authentication device 300, having received the request, reads the biometric information on the authentication target with the biometric sensor 350 and retrieves the biometric information. Further, the biometric authentication device 300 sends the biometric information 12 thus retrieved back to the terminal 200 (s309). The biometric information acquisition unit 215 of the terminal 200 receives the biometric information of the authentication target from the biometric authentication device 300, and stores the above information in the storage unit 201 (s310).

The check instruction unit 216 of the terminal 200 transmits an instruction for checking the biometric information stored in the storage area identified at step s307 against the biometric information of the authentication target to the IC card 100 via the communication unit 207 (s311). In this check instruction transmitted from the check instruction unit 216 are included the pocket information 22 of the authentication target in FIG. 9C (here in the figure, the authentication target pocket of "1" indicates the first pocket 125) and the biometric information 23 in FIG. 9D.

The checking unit 112 of the IC card 100 receives the check instruction from the terminal 200 via the communication unit 107, reads the biometric information (the biometric information 24 in the pocket shown in FIG. 9E) from the storage area indicated in the check instruction, i.e., from the "first pocket", and checks the biometric information 24 against the biometric information 23 of the authentication target included in the check instruction (s312). This checking process of the biometric information can be implemented by applying an existing biometric authentication technique. The checking unit 112 sends the result of the checking process back to the terminal 200 (s313).

The check instruction unit 216 of the terminal 200 receives the check result from the IC card 100 (s314), displays the check result on the output interface 206, and then exits the process.

—Example 4 of Process Flow—

Figure 7:
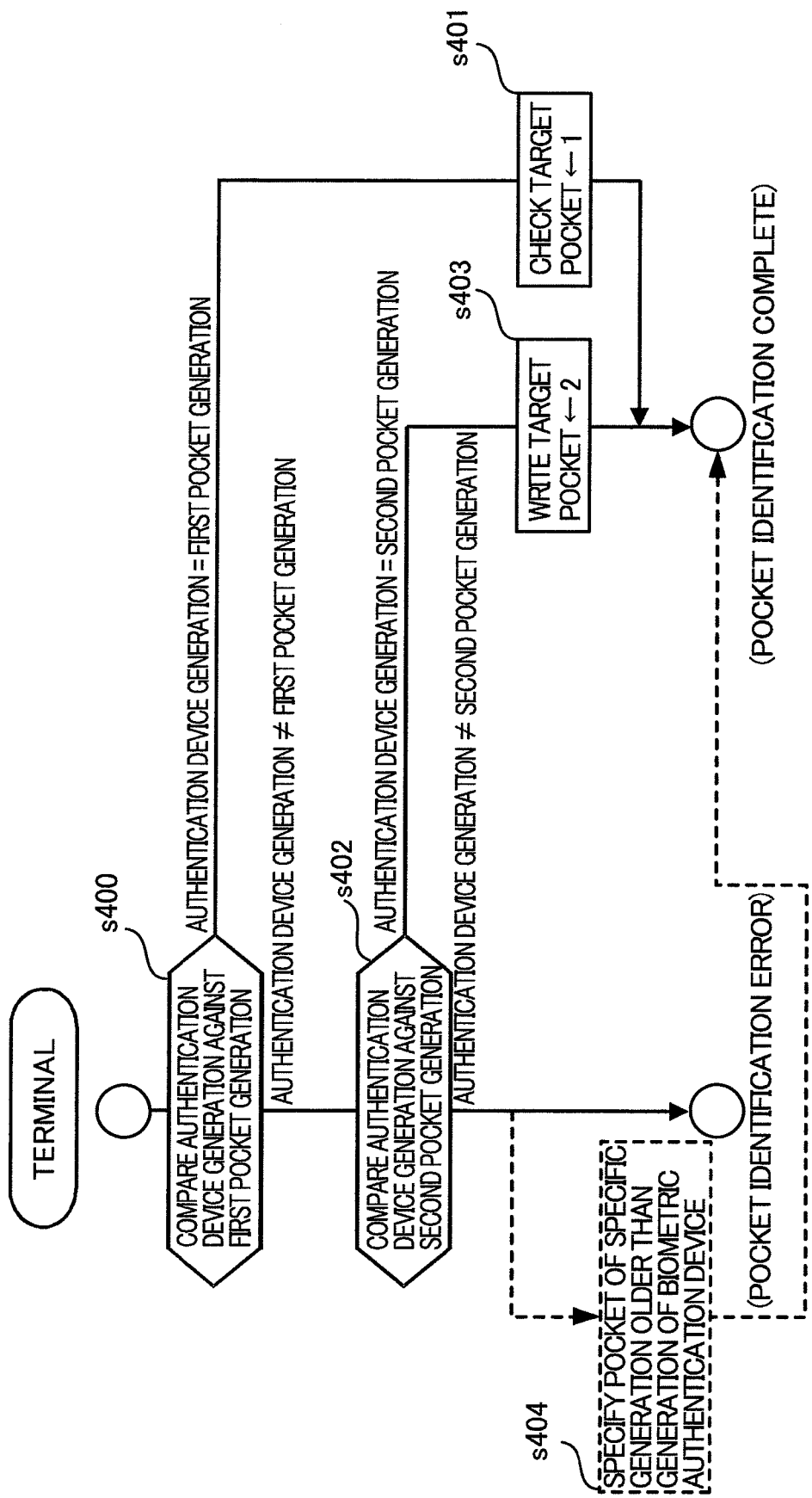
FIG. 7 is a flowchart of an exemplary processing procedure 4 in the present embodiment.

Next, the process at the step s307 in the above third example of the process flow will be described. FIG. 7 is a flowchart showing the fourth example of the processing procedure according to the present embodiment. Here, the check instruction unit 216 of the terminal 200 reads the generation information ("1" in the example in FIG. 9B) of the biometric authentication device 300 from the storage unit 201 and the generation information ("1" in the example in FIG. 9A) of the first pocket 125 and checks both pieces of information against each other (s400).

At the step s400, if the check instruction unit 216 determines the generation of the biometric authentication device 300 and the generation of the first pocket 125 are the same (s400: authentication device generation=generation of the first pocket), the check instruction unit 216 identifies the authentication target pocket as the "first pocket" (s401).

On the other hand, if at the step s400 the check instruction unit 216 determines that the generation of the biometric authentication device 300 is different from the generation of the first pocket 125 (s400: authentication device generation generation of the first pocket), the check instruction unit 216 then reads the generation information of the second pocket 126 from the storage unit 201 ("2" in the example in FIG. 9A), and checks the above information against the generation of the biometric authentication device 300 (s402). At the step s402, when the check instruction unit 216 determines the generation of the biometric authentication device 300 and the generation of the second pocket 126 are the same (s402: authentication device generation=generation of the second pocket), the check instruction unit 216 identifies the authentication target pocket as the "second pocket" (s403).

If the check instruction unit 216 determines at the step s402 that the generation of the biometric authentication device 300 is different from the generation of the second pocket 125 (s402: authentication device generation≠generation of the second pocket), the check instruction unit 216 displays a message indicating an error in pocket determination (prepared in the storage unit 201 beforehand) on the output interface 206 and exits the process. Further, the check instruction unit 216 includes a message requesting registration of the biometric information corresponding to the generation of the biometric authentication device 300 (prepared in the storage unit 201 beforehand) in the error message for the pocket determination.

Note that when the check instruction unit 216 determines at the step s402 that the generation of the biometric authentication device 300 is different from the generation of the second pocket 125, the check instruction unit 216 may identify as the authentication check target pocket a pocket of a generation older than the generation of the biometric authentication device 300 by a predefined number of generations, for example, by 1 generation (s404). For example, when the generation of the biometric authentication device 300 is "2", the pocket of the generation "1" older by 1 generation than the biometric authentication device 300 is identified as the authentication check target pocket. In the above example, the pocket of the generation "1" is the first pocket 125. The background of performing the above process is as follows. The biometric authentication device 300 of a newer generation is able to process biometric information with greater precision than a device of an older generation because of improvements in performance and is often adapted to processing of biometric information for the biometric authentication device 300 of an older generation as an authentication target. By adopting this type of processing, during a transition period when old and new biometric authentication devices 300 coexist, even a user having the IC card 100 in which the biometric information only adapted to the biometric authentication device 300 of an older generation is registered is allowed to utilize both old and new biometric authentication devices 300.

—Example 5 of Process Flow—

Figure 8:
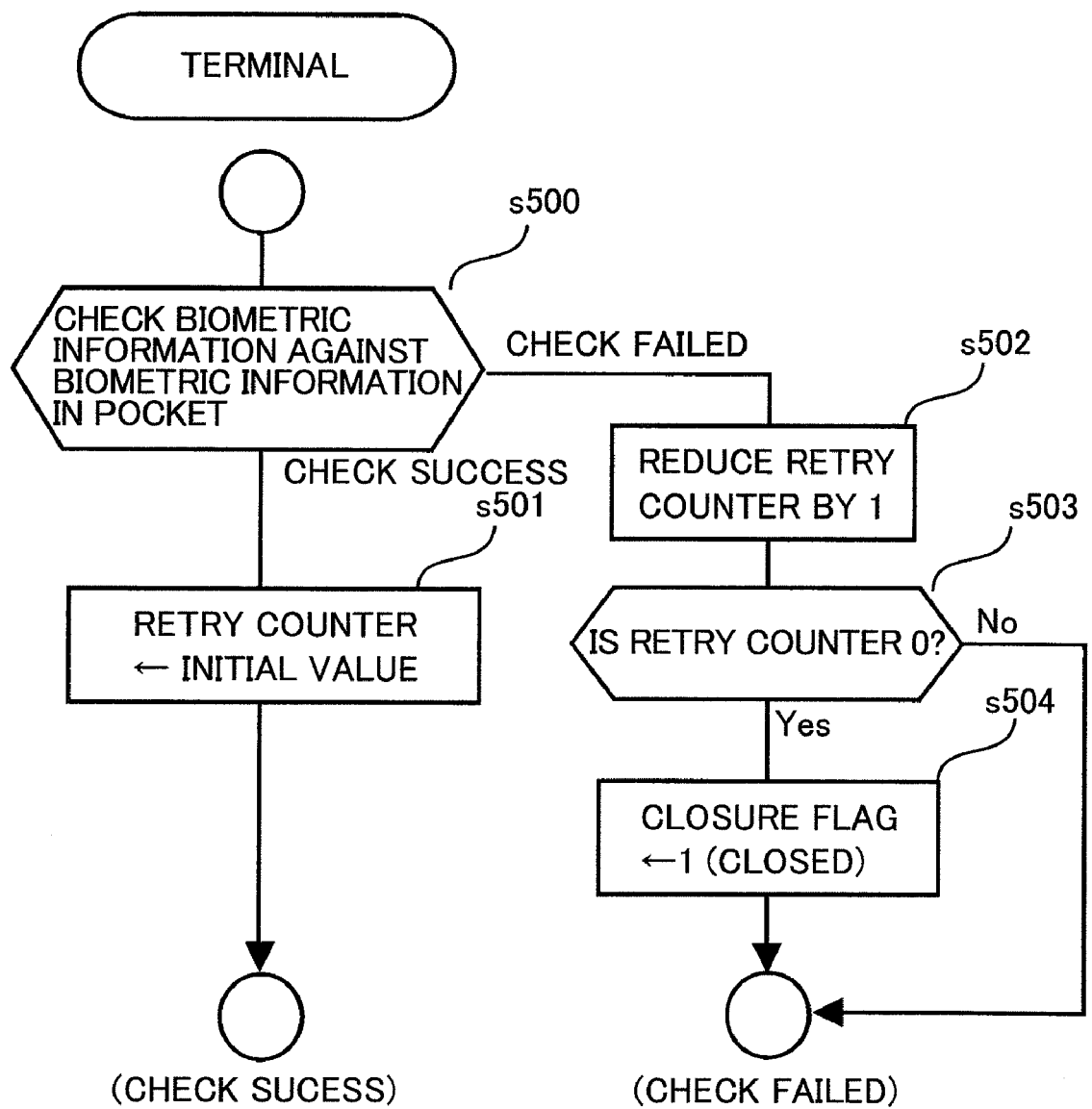
FIG. 8 is a flowchart of an exemplary processing procedure 5 in the present embodiment.

Next, a setting process of the retry counter will be described. FIG. 8 is a flowchart showing the fifth processing procedure according to the present embodiment. According to this process, on performing a checking process in the IC card 100, the check result can be reflected in the retry counter and thus can change the way the IC card 100 is handled.

In this example, the checking unit 112 of the IC card 100 executes the process of checking the biometric information (the step s312 in the third example of the process flow) (s500). When the result indicates inconsistency in the biometric information, i.e., check failure (s500: check failed), the checking unit 112 reduces the retry counter of the corresponding storage area by the predefined value (s502). In the example of the first pocket 125 in FIG. 2A, the initial value of "10" is set to the retry counter, and the retry counter is decremented by 1 to be "9" through the subtraction process at the step s502. On the other hand, when the check process is executed and the cheek result indicates consistency in the biometric information, i.e., check success (s500: check success), the retry counter of the corresponding storage area remains unchanged from the initial value (s501).

After the subtraction process of the retry counter (s502), the checking unit 112 checks the retry counter of "9" of the storage area against a predefined reference value (stored in the storage unit 101 beforehand), and determines whether the retry counter is less than or equal to the predefined reference value (s503). When the retry counter is determined to be the predefined reference value, for example, "0" (s503: Yes), the checking unit 112 sets the closure flag in the flag table 127 in the storage unit 101, indicating that the IC card 100 is invalid (s504). On the other hand, when the retry counter is determined to be greater than the predefined reference value (s503: No), the checking unit 112 sends the check result showing "check failure" back to the terminal 200 and exits the process.

It is to be noted that the retry counter may be provided to each pocket. In this case, according to the performance for each generation (rejection rate for cardholder/acceptance rate for others), a "closure rate" may be set for each generation. Further, the retry counter may be set after the following procedure: For example, the terminal 200 requests the generation information of the biometric authentication device 300, and increments/decrements a reference value by a certain value according to the newness/oldness of the generation information As examples: When the generation is the third generation or newer, the retry counter is set at "2" by decrementing the reference value of "3" by a certain value "1"; or, with the second generation or older, the retry counter is set at "4" by incrementing the reference value of "3" by a certain value "1".).

According to the present embodiment, the following effects can be obtained: in the entities equipped with biometric authentication devices such as financial facilities, with change in the biometric authentication device due to change in the biometric information due to change in a living body over time, improvements in biometric sensor technologies such as an increase in the number of camera pixels and improvements in image analysis capabilities, and so forth, a certain transition period can be provided that is a time period during which old and new devices coexist in the field. Providing such a transition period makes it possible to prompt a user (an IC cardholder) to register biometric information that is compatible with the new devices. Further, the cost and burden of introducing the new devices for replacement of all the old devices can be spread out over the transition period.

At the same time, the user is allowed to continue to use his/her IC card regardless of the transition of the biometric authentication devices. During the transition period, for example, even when the biometric information for the new devices is not yet registered, the user can continue to conduct authentication with the old devices as before. Thus, the user does not experience decrease in usability upon transition of the biometric authentication devices from old to new.

Therefore, upon updating of the biometric authentication devices there can be provided a transition period during which the old and new devices coexist, and it is possible that the burden on the device providers by total replacement of the devices and the burden on the IC card users who are required to update their biometric information is reduced, and even during the transition period the authentication process can still be performed.

—Example 6 of Process Flow—

Figure 10:
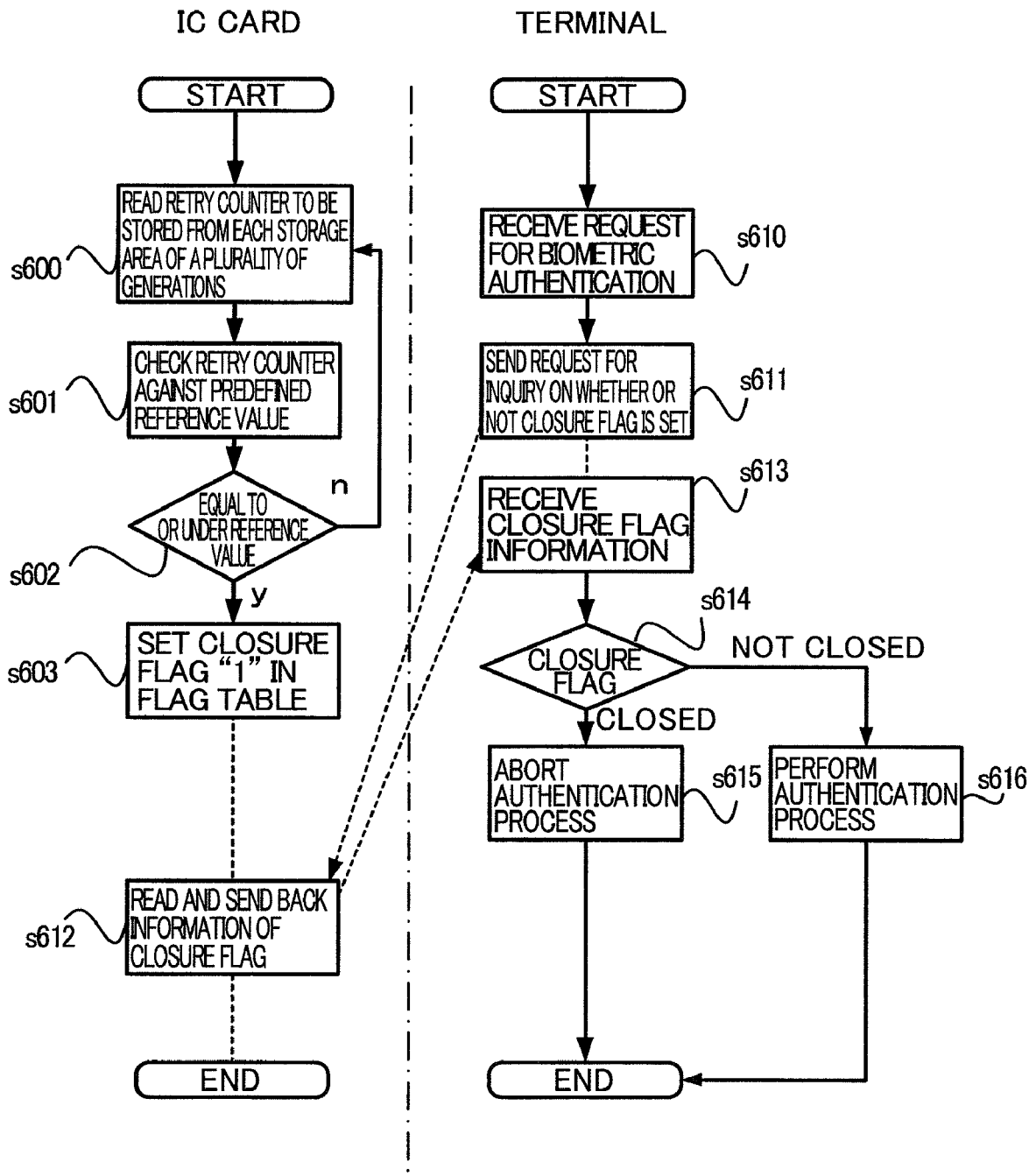
FIG. 10 is a flowchart of an exemplary processing procedure 6 in the present embodiment.

Next, another embodiment of the biometric authentication process performed between the IC card 100 and the terminal 200 will be described. FIG. 10 is a flowchart showing the sixth example of the processing procedure of the present embodiment. In this example, the checking unit 112 of the IC card 100, using the operation unit 104, reads the retry counters respectively stored in the first pocket 125 and the second pocket 126 as the storage areas for the multiple generations, for example, after every elapse of a certain time period or every time the retry counter is updated (s600).

Subsequently, the checking unit 112 checks the retry counter read at the step s600 against the predefined reference value (stored in the storage unit 101 beforehand) (s601). For example, assume that the retry counter for the first pocket 125 is "7", the retry counter for the second pocket 126 is "0", and the predefined reference value is "0". In this case, the checking unit 112 detects through checking at the step s601 that the retry counter for the second pocket 126 has become equal to or less than the predefined reference value among the respective storage areas (s602: y).

At this point, the checking unit 112 sets the closure flag (invalidated flag) of "1" in the flag table 127 of the storage unit 101 indicating that authentication process cannot be performed on the IC card 100 (s603). It is to be noted that the examples of the closure flag may include "1" (closed) and "0" (not closed). On the other hand, when the check at the step s601 indicates that the retry counters of the respective storage areas are both greater than the predefined reference value (s602: n), the process is returned to the step s600.

Here, assume that the terminal 200 has received a request for biometric authentication of the user holding the IC card 100 through the input interface 205 (s610). At this time, the use determination unit 217 of the terminal 200, using the operation unit 204, transmits a request for inquiry on whether or not the closure flag is set (or the kind of the closure flag) to the IC card 100 via the communication unit 207 (s611). The reading unit 110 of the IC card 100, for example, receives the inquiry request, reads the information of the closure flag in the flag table 127 of the storage unit 101, and sends the result back to the terminal 200 (s612). Here, it is also possible that when the closure flag is detected, the reading unit 110 or the checking unit 112 returns a notification of denial of authentication process to the terminal 200, and exits the process.

The use determination unit 217 of the terminal 200 receives the information on the closure flag from the IC card 100 (s613), and, when the information indicates that the closure flag is already set (in an operation in which the closure flag being set means the IC card 100 is invalidated), or the closure flag indicates, for example, "1" (closed) (s614: closed), the use determination unit 217 aborts an authentication process on the corresponding IC card 100 (s615), and exits the process. On the other hand, when the information received at the step s613 indicates that the closure flag is not set (in the operation in which the closure flag being set means the IC card 100 is invalidated), or the closure flag indicates, for example, "0" (not closed) (s614: not closed), the use determination unit 217 performs the subsequent authentication process on the corresponding IC card 100 (s616).

As described above, the retry counter of each of the multiple storage areas of the IC card 100, i.e., the pockets is checked, and, when at least one pocket for which the retry counter is less than the predefined reference value is detected, the terminal 200 aborts the subsequent authentication process on the IC card (not only on the above pocket having the retry counter less than the predefined reference value). Such a configuration keeps the security of the IC card as a whole from being comprised by prohibiting authentication using the biometric information of one pocket while allowing authentication using the biometric information of another pocket.

—Example 7 of Process Flow—

Figure 11:
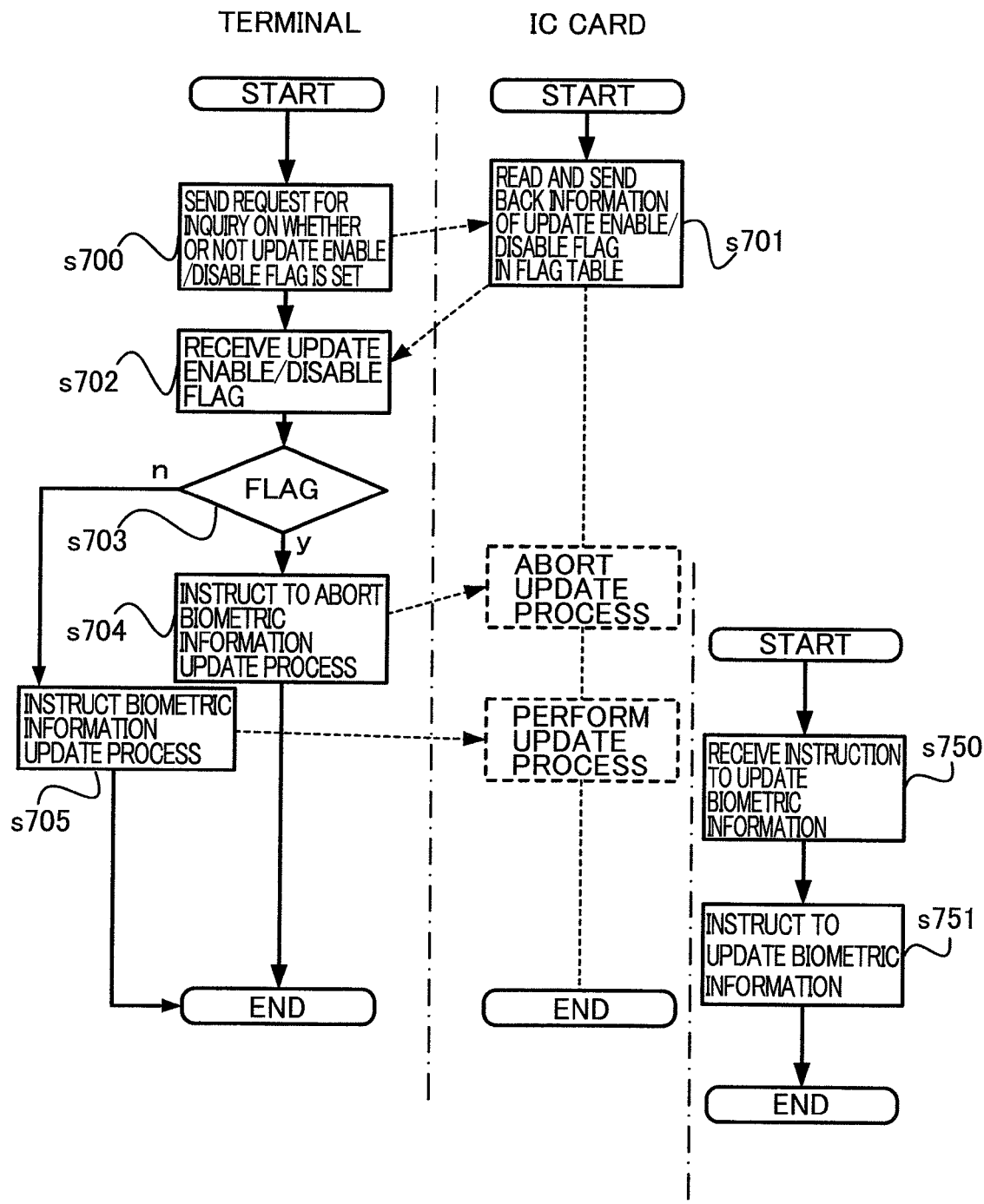
FIG. 11 is a flowchart of an exemplary processing procedure 7 in the present embodiment.

Next, a process of updating the biometric information of the IC card 100 will be described. FIG. 11 is a flowchart showing the seventh processing procedure according to the present embodiment. Here, it is assumed that the IC card 100 stores the update enable/disable flag in the storage unit 101 as well as the closure flag. The update enable/disable flag is the flag for setting "1" (update disable) on all the IC cards 100 beforehand, for example, in the case that such an entity as a financial facility administering the IC card 100 defines a policy that on updating the biometric information the IC card in use must be replaced with a new one as a whole.

In this example, assume that the terminal 200 has received through the input interface 205 an instruction for updating the biometric information. This kind of biometric information update instruction may be input through the terminal 200 by a clerk at a financial facility or the like to process a request for reissue of an IC card made of an IC card-issuing institution such as a financial facility by a user of the IC card who has attempted but failed a predetermined number of times to conduct biometric authentication using the IC card 100, for example.

In this case, the use determination unit 217 of the terminal 200, using the operation unit 204, transmits to the IC card 100 via the communication unit 207 a request for inquiry on whether or not the update enable/disable flag is set in response to the instruction for updating the biometric information received through the input interface 205 (s700). The reading unit 110 of the IC card 100, for example, receives the inquiry request, reads the information on the update enable/disable flag in the flag table 127 of the storage unit 101, and sends the information back to the terminal 200 (s701).

The use determination unit 217 of the terminal 200 receives the information on the update enable/disable flag from the IC card 100 (s702), and, when the information indicates that the update enable/disable flag is "1" (update disabled) (s703: y), instructs to abort the update process of the biometric information of the corresponding IC card 100 (s704). On the other hand, when the information received at the step s702 indicates that the update enable/disable flag is "0" (update enabled) (s703: n), the use determination unit 217 executes the instruction for the following update of the corresponding IC card 100 (s705): The instruction for the update process, for example, includes an instruction transmitted to the IC card 100 for writing the biometric information on the user read by the biometric information sensor at a financial facility and the generation information indicating the pocket. (Example: the generation designated by a clerk at the financial facility or the like, the oldest or the newest generation regarding the pockets.)

By employing this type of processing, advertently updating the biometric information on the IC card 100 that is invalidated and originally designated by the financial facility as prohibited from being updated. That is, this type of processing makes it possible to implement biometric information update processing in compliance with a security policy of the financial facility or the like.

It is to be noted that, in the event that the financial facility or the like does not have a policy under which upon updating of the biometric information on an IC card the IC card as a whole must be renewed, i.e., the update enable/disable flag of "1" (update disable) is not set to all the IC cards 100, the processing procedure described below is performed. In this situation, it is assumed that, as mentioned above, the terminal 200 has received through the input interface 205 the update instruction for the biometric information (s750).

The use determination unit 217 of the terminal 200, using the operation unit 204, in response to the instruction to update biometric information received through the input interface 205, does not transmit a request for inquiry on whether or not the closure flag is set to the IC card 100 but performs the following update instruction on the above IC card 100 (s751). In this case, the writing unit 111 of the IC card 100 performs the update process on the biometric information included in the update instruction (which is the same as the write process in the eighth example of the process flow to be described below). Under a security policy allowing update of the biometric information in the IC card 100, by employing this type of processing, the update process of the biometric information can be efficiently performed.

—Example 8 of Process Flow—

Figure 12:
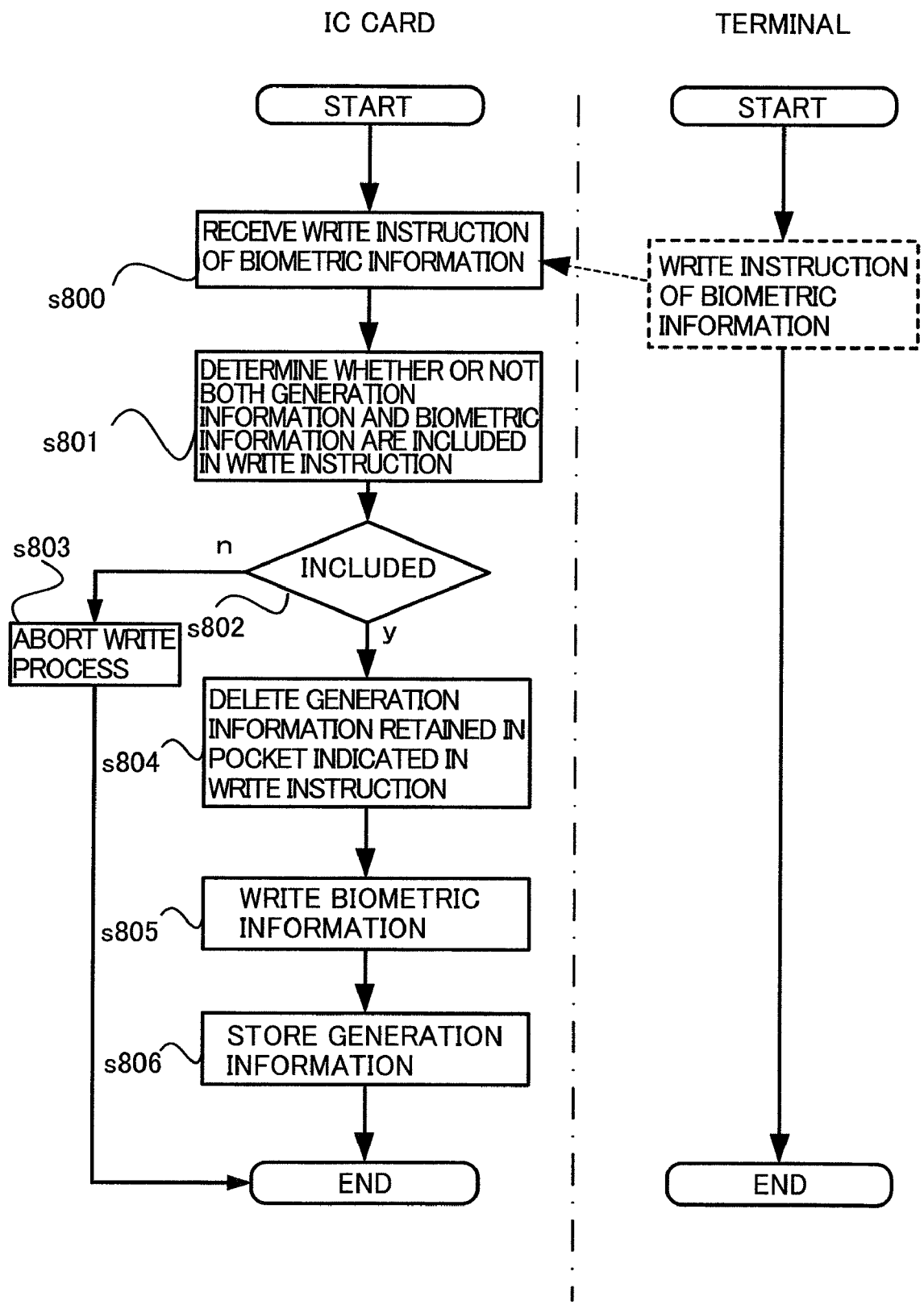
FIG. 12 is a flowchart of an exemplary processing procedure 8 in the present embodiment.

Next, the write process for the biometric information in the IC card 100 will be described. FIG. 12 is a flowchart showing the eighth example of the processing procedure according to the present embodiment. It is to be noted that, in addition to the write process of the biometric information on an empty IC card 100 in which no biometric information is registered the write process here includes the concept of the update process of the biometric information mentioned in the above seventh example of the process flow, for the reason that the update process is a process of overwriting existing biometric information with new biometric information and is thus equivalent to "writing". Therefore, the update process of the biometric information performed by the IC card 100 regarding the above seventh example of the process flow is performed in accordance with the same procedure of the write process of the biometric information to be described below.

Here, it is assumed that the writing unit 111 of the IC card 100 receives the write instruction of the biometric information from the terminal 200 via the communication unit 107 (s800). At this time, the writing unit 111 determines whether or not in the write instruction both the generation information and the biometric information are together included (s801). According to this determination, if it is determined that either the generation information or the biometric information is not included in the write instruction (s802: n), the writing unit 111 aborts the write process according to the write instruction (s803), and exits the process.

On the other hand, if the determination made at the step s801, indicates that both the generation information and the biometric information are included in the write instruction (s802: y), the writing unit 111 identifies the second pocket 126 storing the generation information indicated in the write instruction, e.g., "2", as the generation information, and deletes the generation information of "2" stored in the second pocket 126 (s804).

Further, after deleting of the generation information at the step s804, the writing unit 111 writes the biometric information included in the write instruction in the second pocket 126 (s805). Subsequently, after writing of the biometric information at the step s805, the writing unit 111 stores the generation information of "2" indicated in the write instruction in the second pocket 126 (s806).

By employing this type of writing procedure, for example, even when during the writing process of the biometric information on the IC card 100 communication between the IC card 100 and the IC card reader is interrupted, or the IC card 100 is removed from the IC card reader of the terminal 200, e.g., the communication unit 207, creation of a generation gap between the generation information remaining in the pocket as the storage area and the biometric information can be avoided. Conversely, assume that the biometric information and the generation information written in this order, without employing this type of processing procedure. In that case, if the IC card 100 is removed from the IC card reader after the writing process of the biometric information, for example, then the biometric information is of the new generation whereas the generation information stored in the storage area is of the previous generation. On the other hand, if the generation information and the biometric information are written in this order, it is possible that although the biometric information is of the previous generation the generation information stored in the storage area is of the new generation. By employing the above writing procedure, these troubles can be avoided.

—Example 9 of Process Flow—

Figure 13:
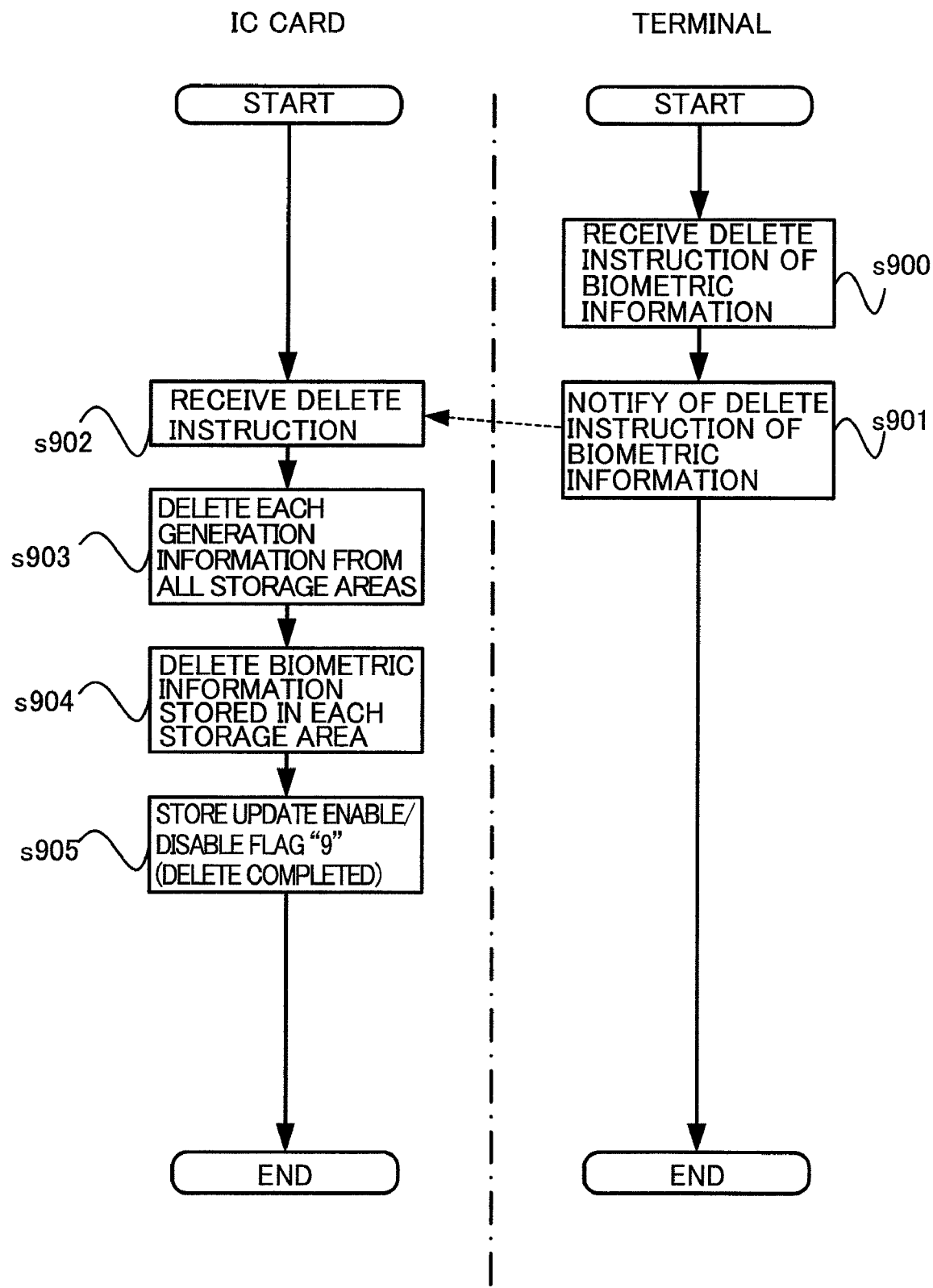
FIG. 13 is a flowchart of an exemplary processing procedure 9 in the present embodiment.

Next, the process of deleting the biometric information in the IC card 100 will be described. FIG. 13 is a flowchart showing the ninth example of the processing procedure according to the present embodiment. For example, assume that the terminal 200 has received through the input interface 205 an instruction for deleting the biometric information (s900). The delete instruction is for deleting the biometric information in the IC card 100, for example, prior to discarding the IC card 100 collected from the user at a financial facility or the like.

At this point, in response to the instruction to delete the biometric information received through the input interface 205, the use determination unit 217 of the terminal 200 does not transmit a request for inquiry on whether or not the closure flag or the update enable/disable flag is set to the IC card 100, and notifies the IC card 100 of the instruction to delete the biometric information (s901). Considering that the idea of the present embodiment is to be able to delete biometric information even on the IC card 100 which is invalidated due to the closure flag and the like, it is natural that the inquiry request is not transmitted.

On the other hand, the writing unit 111 of the IC card 100 receives the instruction to delete the biometric information from the terminal 200 via the communication unit 107 (s902). Regardless of which storage area indicated in the delete instruction, the writing unit 111 deletes in all the storage areas in the storage unit 101, i.e., the first pocket 125 and the second pocket 126 in the above example, the generation information stored in the first pocket 125 and the second pocket 126 (s903).

After deleting the generation information at the step s903, the writing unit 111 performs the delete process on the biometric information stored in the respective storage areas, i.e., in the first pocket 125 and the second pocket 126 (s904). Further, after deleting the biometric information at the step s904, the writing unit 111 stores the update enable/disable flag of "9" (delete completed) as information indicating completion of the above delete process in the flag table 127 in the storage unit 101 (s905), and exits the process.

It is to be noted that the terminal 200 may transmit to the IC card 100 as the delete instruction, for example, the generation of "0", the biometric information of "data of xx bytes for deleting" such as a group of all data of "0", and the update enable/disable flag of "9" (delete completed). In this case, the IC card 100 receives the delete instruction, sets the generation data of "0" in each pocket for the delete process of the generation information, overwrites the biometric information with the "data of xx bytes for deleting" as the delete process of the biometric information, and stores the update enable/disable flag of "9" in the storage unit 101.

By employing this type of delete procedure, for example, even when during the delete process of the biometric information on the IC card 100 communication between the IC card 100 and the IC card reader is interrupted, or the IC card 100 is removed from the IC card reader of the terminal 200, e.g., the communication unit 207, the generation information is deleted first. Therefore, even when executions of authentication or the like of the above IC card 100 are later attempted, the attempt can be rejected since the biometric information remaining in the IC card 100 does not accompany the generation information, and fraudulent reading of the IC card 100 can be avoided. Further, even on the IC card 100 in which the delete process is not completed as above, if the delete process is performed again later, the biometric information can still be deleted normally.

According to the present embodiment as described above, on the IC card which is invalidated, i.e., on the closed card with the closure flag set, while the authentication process is prohibited, the delete process of the biometric information as stored is made possible, and, at a financial facility or the like administering and discarding, etc. the closed card, the burden and the cost for handling the closed card can be reduced. Further, the risk of leakage of the biometric information of the IC card user due to retention of the biometric information in the closed card can be minimized.

Furthermore, even if for some reason such as an error or the like the delete process of the biometric information in the IC card is not completed normally r, regardless of the cause of the abnormal termination, the delete process can be repeated to reduce the cost for handling of the IC card with any abnormality.

Therefore, situational process control of an invalidated card, such that while the authentication process is prohibited it is still possible to delete the biometric information, is made possible, thus reducing the burden and cost of IC card administration.

Although the present invention has been described in detail hereinabove based on the embodiments thereof referring to the accompanying drawings, the present invention is not to be construed as being limited to the above embodiments. It is also to be understood that any variants and equivalents fall under the scope of the present invention without departing from the spirit of the present invention.

What is claimed is:

1. A biometric authentication method implemented with an IC card including an operation unit,
    a communication unit, and a
    storage unit, and
    a terminal including an operation unit,
    a communication unit, and
    a storage unit, the storage unit of the IC card including
        storage areas each storing generation information of a biometric authentication device and
        biometric information corresponding to a generation indicated by the generation information for multiple generations,
    the biometric authentication method comprising:
        receiving, by the operating unit in the IC card, from the terminal a card information request via the communication unit,
        reading, the generation information of each storage area of the respective storage areas for the multiple generations from the storage unit, and
        sending the generation information to the terminal;
        transmitting, by the operating unit in the terminal, the card information request requesting stored information in the storage areas to the IC card via the communication unit,
        receiving the generation information of each of the storage areas from the IC card, and
        storing the generation information in the storage unit;
        transmitting, by the operating unit in the terminal, a request for the generation information to the biometric authentication device via the communication unit,
        receiving the generation information from the biometric authentication device, and storing the generation information in the storage unit;
        transmitting, by the operating unit in the terminal, a request for the biometric information of a registration target to the biometric authentication device via the communication unit,
        receiving the biometric information of the registration target from the biometric authentication device, and storing the biometric information in the storage unit;
        reading, by the operating unit in the terminal, the generation information of the biometric authentication device from the storage unit and the generation information of each of the storage areas,
        checking the generation information of the biometric authentication device against the generation information of each of the storage areas,
        identifying the storage area of same generation as the generation of the biometric authentication device, and
        transmitting an instruction for writing the biometric information of the registration target in the thus-identified storage area to the IC card via the communication unit;
        in the terminal, when a storage area of the same generation as the generation of the biometric authentication device is not identified after checking the generation information of the biometric authentication device against the generation information of each of the storage areas,
        checking, by the operation unit, the generation information of the respective storage areas against each other,
        identifying the storage area of oldest generation, and
        transmitting an instruction for writing the biometric information of the registration target in the thus-identified storage area to the IC card via the communication unit; and
        receiving, by the operation unit in the IC card, the instruction for writing the biometric information from the terminal via the communication unit, and
        writing the biometric information of the
        registration target and the generation information of the biometric authentication device in the storage area indicated in the instruction for writing.

2. The biometric authentication method according to claim 1, wherein,
    storing, by the storage unit in the IC card, an update enable or disable flag indicating whether or not the biometric information stored in the storage area is allowed to be updated, and
    wherein, in the terminal,
    transmitting, by the operation unit, a request for inquiring about the update enable or disable flag to the IC card via the communication unit,
    receiving information on the update enable or disable flag from the IC card, and,
    when the information on the update enable or disable flag indicates that the update is disabled, aborting writing of the biometric information in the IC card.

3. The biometric authentication method according to claim 1, wherein, in the IC card, when the operation unit receives any of the instruction for writing the biometric information and an instruction for deleting the biometric information from the terminal via the communication unit, deleting, by the operation unit, the generation information of the biometric authentication device stored in the storage area indicated in the write instruction or the delete instruction, writes or deletes the biometric information after deleting the generation information, and storing the generation information of the biometric authentication device included in the write instruction in the storage area after writing the biometric information.

4. A biometric authentication method implemented with an IC card including an operation unit, a communication unit, and a storage unit, and a terminal including an operation unit, a communication unit, and a storage unit, the storage unit of the storing, by storage areas in IC card, each generation information of a biometric authentication device and biometric information corresponding to a generation indicated by the generation information for multiple generations, the biometric authentication method comprising:

receiving, by the operation in the IC card, from the terminal a card information request via the communication unit, reading the generation information of each storage area of the respective storage areas for the multiple generations from the storage unit, and sending the generation information to the terminal;

transmitting, by the operation unit in the terminal, the card information request requesting stored information in the storage areas to the IC card via the communication unit, receiving the generation information of each of the storage areas from the IC card, and storing the generation information in the storage unit;

transmitting, by the operation unit in the terminal, a request for the generation information to the biometric authentication device via the communication unit, receiving the generation information from the biometric authentication device, and storing the generation information in the storage unit;

transmitting, by the operation unit in the terminal, a request for the biometric information of an authentication target to the biometric authentication device via the communication unit, receiving the biometric information of the authentication target from the biometric authentication device, and storing the biometric information in the storage unit;

reading, by the operation unit in the terminal, the generation information of the biometric authentication device from the storage unit and the generation information of each of the storage areas, checking the generation information of the biometric authentication device against the generation information of each of the storage areas, identifying the storage area of the same generation as the generation of the biometric authentication device, and transmitting an instruction for checking the biometric information of the authentication target against the generation information stored in the thus-identified storage area to the IC card via the communication unit; and receiving, by the operation unit in the IC card, the instruction for checking from the terminal via the communication unit, checking the biometric information of the authentication target in the instruction for checking against the biometric information stored in the storage area indicated in the instruction for checking, and sending a result of the checking to the terminal.

5. The biometric authentication method according to claim 4, wherein, in the terminal, when a storage area of the same generation as the generation of the biometric authentication device is not identified after checking the generation information of the biometric authentication device against the generation information of each of the storage areas, outputting, by the operation unit, a message requesting registration of the biometric information corresponding to the generation of the biometric authentication device to an output interface.

6. The biometric authentication method according to claim 4, wherein, in the terminal, when a storage area of the same generation as the generation of the biometric authentication device is not identified after checking the generation information of the biometric authentication device against the generation information of each of the storage areas, identifying, by the operation unit, the storage area of a generation prior to the generation of the biometric authentication device by a predefined number of generations, and transmitting an instruction for checking the biometric information stored in the thus-identified storage area against the biometric information of the authentication target to the IC card via the communication unit.

7. The biometric authentication method according to claim 4, wherein, storing, by the storage unit in the IC card, a retry counter indicating an allowed number of times that, for each of the storage areas for the multiple generations, the biometric information stored in the storage area and the biometric information of the authentication target are determined to be inconsistent after the checking, wherein, in the IC card, when the biometric information stored in the storage area is inconsistent with the biometric information of the authentication target after checking the biometric information stored in the storage area indicated in the instruction for checking against the biometric information of the authentication target included in the instruction for checking, decrementing, by the operation unit, the retry counter of the storage area by a predefined value, wherein, checking, by the operation unit in the IC card, the retry counter of the storage area against a predefined reference value, and, when it is detected that the retry counter is equal to or less than the predefined reference value, sets an invalidated flag indicating that the IC card is invalidated to the storage unit, and wherein, transmitting, by the operation unit in the terminal, a request for inquiring whether or not the invalidated flag is set to the IC card via the communication unit, receiving information on setting of the invalidated flag from the IC card, and, when the information on the setting of the invalidated flag indicates that the invalidated flag is set, aborting processing the IC card.

8. The biometric authentication method according to claim 4, wherein, storing, by storage unit in the IC card, a retry counter indicating an allowed number of times that, for each of the storage areas for the multiple generations, determining inconsistent after checking the biometric information stored in the storage area and the biometric information of the authentication target, wherein, in the IC card, when the biometric information stored in the storage area is inconsistent with the biometric information of the authentication target after checking the biometric information stored in the storage area indicated in the instruction for checking against the biometric information of the authentication target included in the instruction for checking, decrementing, by the operation unit, the retry counter of the storage area by a predefined value, wherein, checking, in the IC card, the operation unit, the retry counter of each of the storage area for the multiple generations against a predefined reference value, and, detecting when any of the retry counters are equal to or less than the predefined reference value, setting an invalidated flag indicating that authentication on the IC card is invalidated to the storage unit, and wherein transmitting, by the operation unit in the terminal, a request for inquiring whether or not the invalidated flag is set to the IC card via the communication unit, receiving information on setting of the invalidated flag from the IC card, and, when the information on the setting of the invalidated flag indicates that the invalidated flag is set, aborting processing the IC card.

9. The biometric authentication method according to claim 8, wherein, detecting, by the operation unit in the IC card, whether or not the invalidated flag is set in the storage unit on receiving the instruction for checking from the terminal, and when detecting the invalidated flag, sending a notification of rejecting authentication to the terminal, and exits a process.

10. The biometric authentication method according to claim 8, wherein, storing, by the storage unit in the IC card, an update enable or disable flag indicating whether or not the biometric information stored in the storage area is allowed to be updated with the invalidated flag, and wherein, transmitting, by the operation unit in the terminal, a request for inquiring whether or not the update enable or disable flag is set in response to an instruction for updating the biometric information received through an input interface to the IC card via the communication unit, receiving information on setting of the update enable or disable flag from the IC card, and when the information on the setting of the update enable or disable flag indicates that updating is disabled, aborting updating the biometric information on the IC card.

11. The biometric authentication method according to claim 8, wherein, rejecting, by the operation unit in the IC card, an authentication request from the terminal when the invalidated flag is set, accepting a request for updating or deleting the biometric information from the terminal, and updating or deleting the biometric information.

12. The biometric authentication method according to claim 8, wherein, in the terminal, the operation unit does not transmit a request for inquiring whether or not the update enable or disable flag is set in response to an instruction for deleting the biometric information received through the input interface to the IC card, and sending an instruction for deleting the biometric information to the IC card.

13. The biometric authentication method according to claim 8, wherein, receiving, by the operation unit in the IC card, from the terminal an instruction for writing the biometric information via the communication unit, determining, by the operation unit, whether or not both the generation information and the biometric information are included in the instruction for writing, and when any of the generation information and the biometric information is not included in the instruction for writing, aborting writing in response to the instruction for writing.

14. The biometric authentication method according to claim 8, wherein, receiving, by the operation unit in the IC card, an instruction for deleting the biometric information from the terminal via the communication unit, deleting, by the operation unit, the generation information in the storage areas of all generations regardless of which storage area is indicated in the instruction for deleting, deleting the biometric information after deleting the generation information, and storing information indicating that the deleting is completed in the storage area after deleting the biometric information.

15. A biometric authentication system comprising:
an IC card; and
a terminal,
the IC card including
an operation unit,
a communication unit, and
a storage unit including storage areas each storing generation information of a biometric authentication device and biometric information corresponding to a generation indicated by the generation information for multiple generations,
a reading unit, in the operation unit, receiving from the terminal a card information request via the communication unit, reading the generation information of each storage area of the respective storage areas for the multiple generations from the storage unit, and sending the generation information to the terminal,
a writing unit, in the operation unit, receiving an instruction for writing the biometric information from the terminal via the communication unit, and writing the biometric information of a registration target and the generation information of the biometric authentication device in the storage area indicated in the instruction for writing,
the terminal including
an operation unit,
a communication unit,
a storage unit,
a card generation acquisition unit, in the operation i0 unit, transmitting a card information request requesting stored information in the storage are as to the IC card via the communication unit, receiving the generation information of each of the storage areas from the IC card, and storing the generation information in the storage unit, a device generation acquisition unit, in the operation unit, transmitting a request for the generation information to the biometric authentication device via the communication unit, receiving the generation information from the biometric authentication device, and storing the generation information in the storage unit, a biometric information acquisition unit, in the operation unit, transmitting a request for the biometric information of the registration target to the biometric authentication device via the communication unit, receiving the biometric information of the registration target from the biometric authentication device, and storing the biometric information in the storage unit, a first write instruction unit, in the operation unit, reading the generation information of the biometric authentication device from the storage unit and the generation information of each of the storage areas, checking the generation information of the biometric authentication device against the generation information of each of the storage areas, identifying a storage area of the same generation as the generation of the biometric authentication device, and transmitting an instruction for writing the biometric information of the registration target in the thus-identified storage area to the IC card via the communication unit, a second write instruction unit, in the operation unit, when a storage area of the same generation as the generation of the biometric authentication device is not identified after checking the generation information of the biometric authentication device against the generation information of each of the storage areas, checking the generation information of the respective storage areas against each other, identifying the storage area of the oldest generation, and transmitting an instruction for writing the biometric information of the registration target in the thus-identified storage area to the IC card via the communication unit.

16. A terminal comprising:
an operation unit;
a communication unit;
a storage unit;
a card generation acquisition unit, in the operation unit, transmitting a card information request requesting stored information in the storage areas to the IC card via the communication unit, receiving the generation information of each of the storage areas from the IC card, and storing the generation information in the storage unit;
a device generation acquisition unit, in the operation unit, transmitting a request for the generation information to the biometric authentication device via the communication unit, receiving the generation information from the biometric authentication device, and storing the generation information in the storage unit;
a biometric information acquisition unit, in the operation unit, transmitting a request for the biometric information of a registration target to the biometric authentication device via the communication unit, receiving the biometric information of the registration target from the biometric authentication device, and storing the biometric information in the storage unit;
a first write instruction unit, in the operation unit, reading the generation information of the biometric authentication device from the storage unit and the generation information of each of the storage areas, checking the generation information of the biometric authentication device against the generation information of each of the storage areas, identifying a storage area of the same generation as the generation of the biometric authentication device, and transmitting an instruction for writing the biometric information of the registration target in the thus-identified storage area to the IC card via the communication unit; and a second write instruction unit, in the operation unit, when a storage area of the same generation as the generation of the biometric authentication device is not identified as a result of checking the generation information of the biometric authentication device against the generation information of each of the storage areas, checking the generation information of the respective storage areas against each other, identifying the storage area of the oldest generation, and transmitting an instruction for writing the biometric information of the registration target in the thus-identified storage area to the IC card via the communication unit.

17. A biometric authentication system comprising:
an IC card; and
a terminal,
the IC card including
an operation unit, a communication unit, and
a storage unit including storage areas each storing generation information of a biometric authentication device and biometric information corresponding to a generation indicated by the generation information for multiple generations,
a reading unit, in the operation unit, receiving from the terminal a card information request via the communication unit, reading the generation information of each storage area of the respective storage areas for the multiple generations from the storage unit, and sending the generation information back to the terminal,
a checking unit, in the operation unit, receiving the instruction for checking from the terminal via the communication unit, checking the biometric information of an authentication target in the instruction for checking against the biometric information stored in the storage area indicated in the instruction for checking, and sending a result of the checking back to the terminal,
the terminal including
an operation unit,
a communication unit,
a storage unit,
a card generation acquisition unit, in the operation unit, transmitting the card information request requesting stored information in the storage areas to the IC card via the communication unit, receiving the generation information of each of the storage areas from the IC card, and storing the generation information in the storage unit,
a device generation acquisition unit, in the operation unit, transmitting a request for the generation information to the biometric authentication device via the communication unit, receiving the generation information from the biometric authentication device, and storing the generation information in the storage unit,
a biometric information acquisition unit, in the operation unit, transmitting a request for the biometric information of the authentication target to the biometric authentication device via the communication unit, receiving the biometric information of the authentication target from the biometric authentication device, and storing the biometric information in the storage unit, and a check instruction unit, in the operation unit, reading the generation information of the biometric authentication device from the storage unit and the generation information of each of the storage areas, checking the generation information of the biometric authentication device against the generation information of each of the storage areas, identifying a storage area of the same generation as the generation of the biometric authentication device, and transmitting an instruction for checking the biometric information of the authentication target against the biometric information stored in the thus-identified storage area to the IC card via the communication unit.

18. A terminal comprising:

an operation unit;

a communication unit;

a storage unit;

a card generation acquisition unit, in the operation unit, transmitting the card information request requesting stored information in the storage areas to an IC card via the communication unit, receiving the generation information of each of the storage areas from the IC card, and storing the generation information in the storage unit;

a device generation acquisition unit, in the operation unit, transmitting a request for the generation information to a biometric authentication device via the communication unit, receiving the generation information from the biometric authentication device, and storing the generation information in the storage unit;

a biometric information acquisition unit, in the operation unit, transmitting a request for the biometric information of an authentication target to the biometric authentication device via the communication unit, receiving the biometric information of the authentication target from the biometric authentication device, and storing the biometric information in the storage unit; and a check instruction unit, in the operation unit, reading the generation information of the biometric authentication device from the storage unit and the generation information of each of the storage areas, checking the generation information of the biometric authentication device against the generation information of each of the storage areas, identifying a storage area of the same generation as the generation of the biometric authentication device, and transmitting an instruction for checking the biometric information of the authentication target against the biometric information stored in the thus-identified storage area to the IC card via the communication unit.

* * * * *